US008363561B2

(12) United States Patent
Hayashino et al.

(10) Patent No.: US 8,363,561 B2
(45) Date of Patent: Jan. 29, 2013

(54) CONTROL DEVICE, TERMINAL DEVICE, AND COMMUNICATION SYSTEM

(75) Inventors: Hiroshi Hayashino, Hyogo (JP); Yoshitaka Ohta, Osaka (JP)

(73) Assignee: Panasonic Corporation, Osaka (JP)

( * ) Notice: Subject to any disclaimer, the term of this patent is extended or adjusted under 35 U.S.C. 154(b) by 48 days.

(21) Appl. No.: 12/677,369

(22) PCT Filed: Jul. 6, 2009

(86) PCT No.: PCT/JP2009/003132
§ 371 (c)(1),
(2), (4) Date: Mar. 10, 2010

(87) PCT Pub. No.: WO2010/007738
PCT Pub. Date: Jan. 21, 2010

(65) Prior Publication Data
US 2011/0096679 A1 Apr. 28, 2011

(30) Foreign Application Priority Data

Jul. 15, 2008 (JP) ................................. 2008-184261

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04B 7/00* (2006.01)
*H04W 4/00* (2009.01)
*H04J 3/06* (2006.01)
*H04W 36/00* (2009.01)

(52) U.S. Cl. ...................................... 370/252

(58) Field of Classification Search ........................ None
See application file for complete search history.

(56) References Cited

U.S. PATENT DOCUMENTS
2005/0083896 A1 4/2005 Hong et al.

FOREIGN PATENT DOCUMENTS
CN 101103638 A 1/2008
JP 2005-79985 3/2005
(Continued)

OTHER PUBLICATIONS
International Search Report issued Aug. 11, 2009 in corresponding International Application No. PCT/JP2009/003132.

*Primary Examiner* — Xavier Szewai Wong
(74) *Attorney, Agent, or Firm* — Wenderoth, Lind & Ponack, L.L.P.

(57) ABSTRACT

Provided is, a wireless network that conducts wireless communications having superior latency and power-saving performance, while avoiding interference wave influences by using multiple channels. Besides conducting communications with wireless communication terminals 102 to 104 by switching a channel in each beacon period and transmitting a beacon frame, a control device 101: measures communication conditions of the channel and interference wave influences; determines availability of the channel; and stores available channel information. The control device 101 delivers the available channel information in the beacon frame to the terminal devices 102 to 104. The terminal devices 102 to 104: select an optimum channel by switching the channel in each beacon period depending on the available channel information in the received beacon frame and on transmission conditions of the channel used by oneself; and conduct the wireless communications. With this, it is possible to switch usage channels rapidly while avoiding interference wave influences.

19 Claims, 17 Drawing Sheets

FOREIGN PATENT DOCUMENTS

| | | | |
|---|---|---|---|
| JP | 2005079985 A * | 3/2005 | |
| JP | 2005-124190 | 5/2005 | |
| JP | 2005124190 A * | 5/2005 | |
| JP | 2007-214842 | 8/2007 | |
| JP | 2007214842 A * | 8/2007 | |
| JP | 2008-48365 | 2/2008 | |
| WO | 2005/055621 | 6/2005 | |

* cited by examiner

F I G. 3
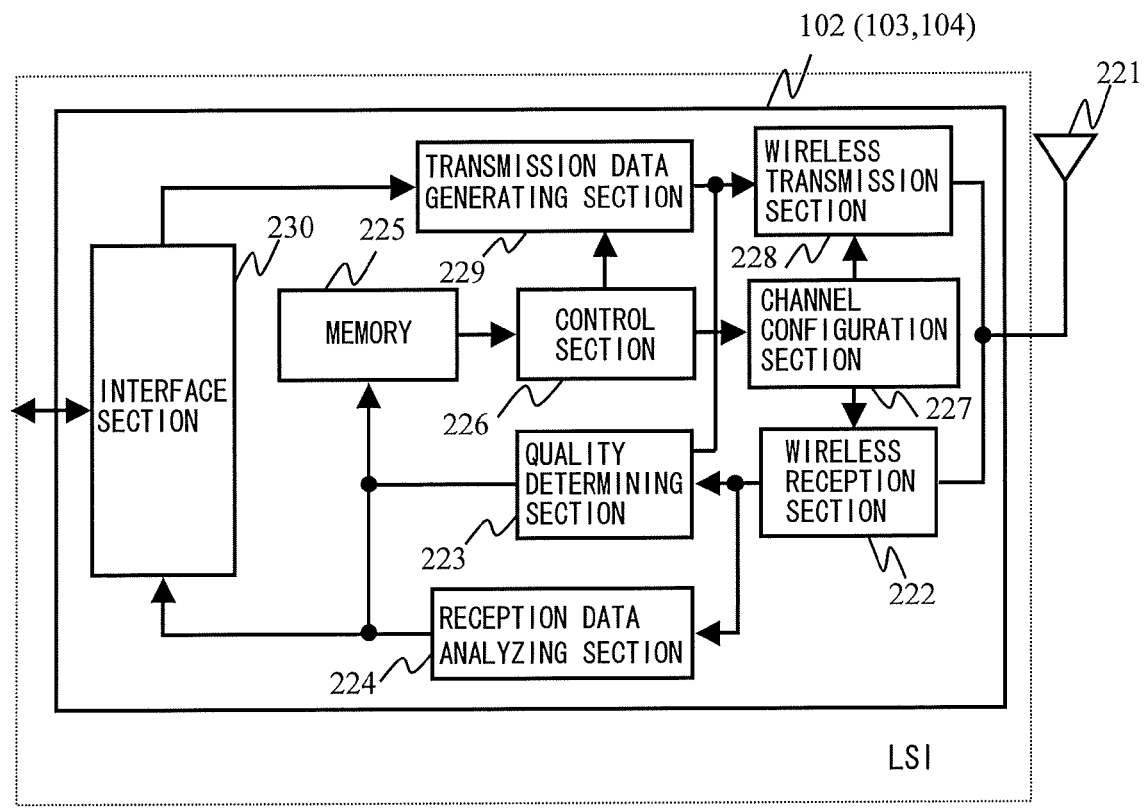
F I G. 4
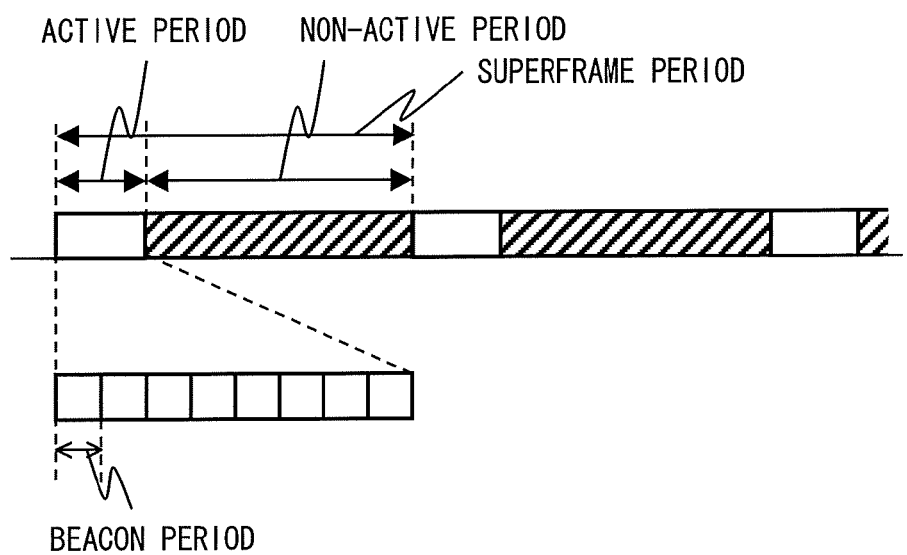

BEACON PERIOD NUMBER

F I G. 1 2
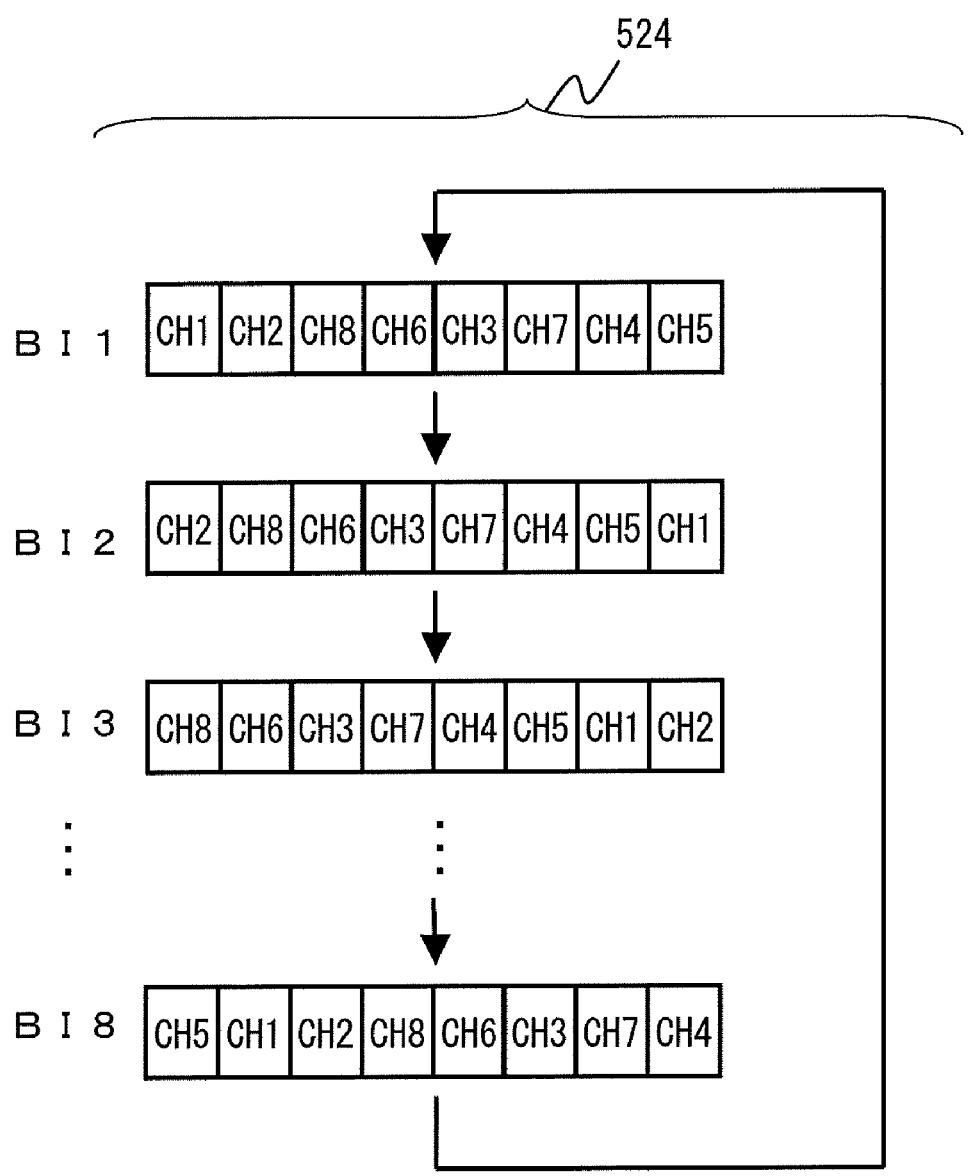

F I G. 1 4
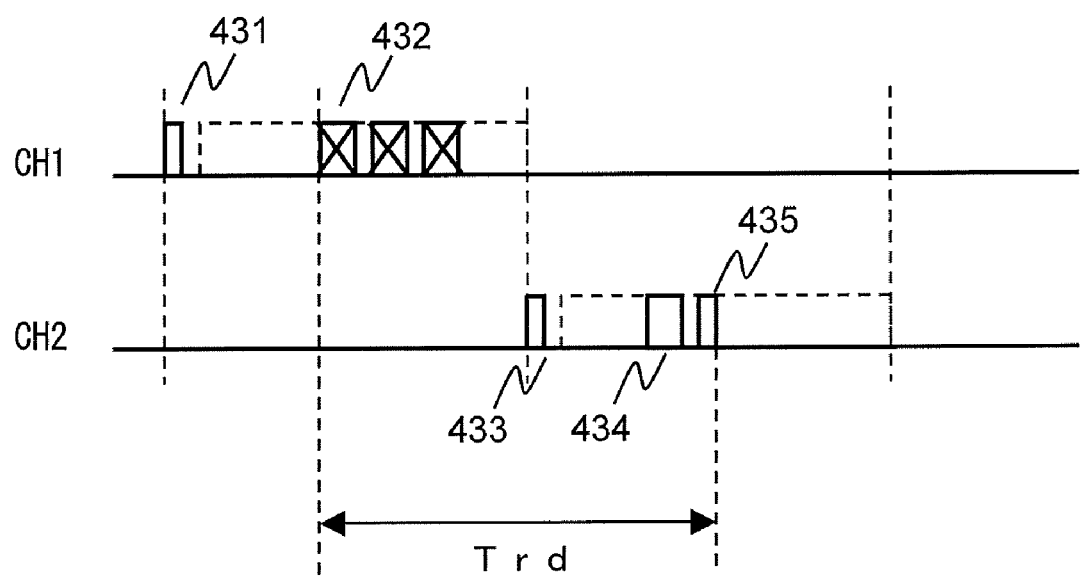

F I G. 1 5
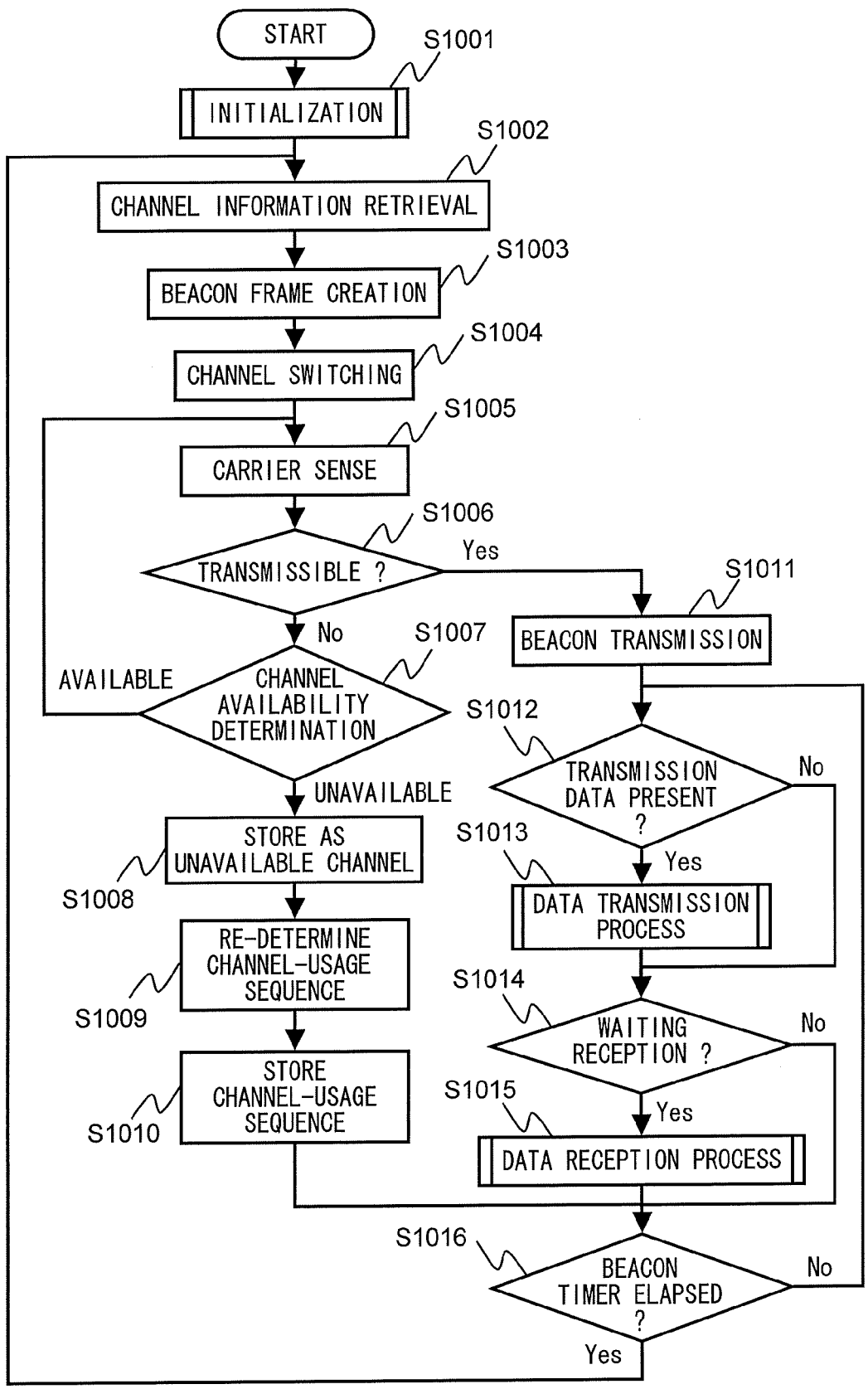

CONTROL DEVICE, TERMINAL DEVICE, AND COMMUNICATION SYSTEM

TECHNICAL FIELD

The present invention relates to a control device, a terminal device, a communication system, and a communication method, which are used in a wireless network. In particular, the present invention relates to an interference avoidance technology for a sensor network, and a wireless network that includes multiple wireless communication terminals such as an active RF (Radio Frequency) tag and the like.

BACKGROUND ART

In recent years, networks such as WPAN (Wireless Personal Area Network) and a sensor network, which include a wireless communication terminal that is compact and consumes low power, are attracting attention. One system that is similar to these is a system which includes an active RF tag that actively transmits a wireless signal.

FIG. 24 is a figure showing one configuration example of a conventional wireless network 700. In FIG. 24, the conventional wireless network 700 includes: a control device 701, and a plurality of terminal devices 702 to 704. The control device 701 is a wireless communication terminal that controls a communication within the wireless network 700. The control device 701 incorporates, in a beacon frame, control information regarding the wireless network 700, and periodically broadcasts the control information. The terminal devices 702 to 704 are wireless communication terminals that communicate with the control device 701 based on the control information. The terminal devices 702 to 704 can use various methods as an access method, and for example, CSMA (Carrier Sense Multiple Access), TDMA (Time Division Multiple Access), FDMA (Frequency Division Multiple Access), and SDMA (Space Division Multiple Access) can be used.

Although the terminal devices 702 to 704 that are used in these wireless networks have a slow transmission speed (from several kbps to several hundred kbps), and a short wireless-signal reaching distance (from several meters to several tens of meters); the terminal devices 702 to 704 are compact and a battery therein has a low-power-consumption capability that can keep driving a terminal device for several years. Improvements have been implemented in a communication protocol and in a frame format in order to reduce a power consumption of the terminal devices 702 to 704; and one example has a configuration that provides an active period for conducting a communication within the wireless network 700, and a non-active period that allows it to enter a sleep mode by not conducting a communication. With regard to the terminal devices 702 to 704, if a prolonged non-active period can be obtained, a prolonged sleep mode can also be obtained; thus the power consumption of the terminal devices 702 to 704 can be reduced.

FIG. 25 shows a superframe period which is one example of a periodical frame configuration. In FIG. 25, the superframe period includes an active period and a non-active period. The active period is a period for conducting communications between the control device 701 and the terminal devices 702 to 704. The non-active period is a period during which a communication is not conducted, and in this period, each of the terminal devices 702 to 704 can reduce power consumptions by entering a sleep mode.

The control device 701 and the terminal devices 702 to 704, all commonly use the active period. The beginning of the active period is used by the control device 701, and the control device 701 broadcasts a beacon frame. The remainder of the active period is used for communications between the control device 701 and the terminal devices 702 to 704, and, for example, CSMA and the like can be used. Furthermore, the active period can be divided into a plurality of time slots, and the slots can be shared between slot CSMA and TDMA. For example, with IEEE 802.15.4 standard, the first half of the time slots are used for a competitive access by CSMA, and each of the time slots in the second half are assigned to be used by a wireless communication terminal to conduct a communication.

The beacon frame includes the control information such as: the number of these time slots and assignment rules of these, a length of the active period, a length of the non-active period, a time until a next beacon frame transmission, and the like.

FIG. 26 shows one example of a communication sequence between the control device 701 and the terminal devices 702 to 704. Referring to FIG. 26, the control device 701 broadcasts a beacon frame 360 at the beginning of an active period 351. The terminal devices 702 to 704 receive the beacon frame 360 and acquire the control information. The control information includes information such as the length of the active period, the length of the non-active period, and the like.

Communications are conducted between the control device 701 and the terminal devices 702 to 704 in the active period 351. For example, the terminal devices 702 to 704 transmit data frames 361, 363, and 365 to the control device 701; and the control device 701 responds with ACK (Acknowledgement) frames 362, 364, and 366.

The communications between the control device 701 and the terminal devices 702 to 704 are not conducted in a non-active period 352. The control device 701 and the terminal devices 702 to 704 can enter a sleep mode during the non-active period 352, and can reduce the power consumption. The control device 701 and the terminal devices 702 to 704 return to an operation mode immediately before the end of the non-active period 352, and prepare for the communication in an active period 353 which is next.

When the non-active period 352 ends, the control device 701 starts the active period 353 which is next, and broadcasts a beacon frame 370. Communications are conducted between the control device 701 and the terminal devices 702 to 704 in the active period 353.

An example shown here is one in which a communication from the terminal device 702 fails. Suppose a case where a data frame 371 is transmitted from the terminal device 702 to the control device 701, but a reception error of the data frame 371 is generated at the control device 701. In this case, the control device 701 does not transmit, to the terminal device 702, an ACK frame in response to the data frame 371.

Although the terminal device 702 will continue waiting for an ACK frame from the control device 701 for a predefined period; when the ACK frame is not returned (i.e. an occurrence of a time-out), the terminal device 702 determines that the transmission has failed. Then, the terminal device 702 attempts to retransmit a data frame 372. Here, suppose a case where the retransmitted data frame 372 has been safely received by the control device 701. In this case, the control device 701 transmits, to the terminal device 702, an ACK frame 373 in response to the retransmitted data frame 372, and the communication ends.

Subsequently, similar operations are repeated, and communications between the control device 701 and the terminal devices 702 to 704 are conducted. A wireless communication system disclosed in patent literature 1 is an example of the system that conducts the communication utilizing the active period and the non-active period described above.

CITATION LIST

Patent Literature

[PTL 1] Japanese Laid-Open Patent Publication No. 2008-48365 (page 12, FIG. 3)

SUMMARY OF INVENTION

Technical Problem

However, a frequency band used by the conventional wireless network 700 often becomes a frequency band that is shared with other wireless communication systems, and interferences from the other wireless communication systems becomes a problem. For example, a frequency band of 2.4 GHz in Japan is a frequency band that is shared with many wireless communication systems such as wireless LAN and wireless PAN. Furthermore, a passive RF tag and an active RF tag use an identical channel in a part of a frequency band of 950 MHz. In addition, when a wireless communication system that uses a large transmission power (e.g. mobile phone system and the like) is conducting communications in an adjacent frequency band, a wireless communication terminal, which uses a compact and simple radio-frequency component such as the active RF tag, cannot acquire a channel selectivity and may possibly be subjected to interferences.

Influences of interferences cannot be avoided in such frequency bands which are often subjected to interferences from other wireless communication systems, if communication is conducted continuously in an identical frequency channel; thus, it is necessary to change the frequency channel that is used.

However, in order to change the frequency channel, it is necessary to search, on both the control device 701 side and the terminal devices 702 to 704 sides, for a frequency channel that is minimally affected by interferences; thus, leading to a problem where communications cannot be conducted and it is not possible to enter a sleep mode while a new frequency channel is being searched, resulting in a large communication delay and a large power consumption.

Therefore, an objective of the present invention is to provide a control device, a terminal device, and a system and a method which use those, all of which are capable of solving the above described problem by selecting a frequency channel so as to avoid a frequency channel having interferences, and by changing, in a short period of time, a frequency channel that is used.

Solution to Problem

A control device, which is one mode of the present invention and which solves the conventional problem, is directed toward a control device that controls, within a wireless network that includes one or more terminal devices, a wireless communication by using a plurality of frequency channels. The control device according to the present invention includes: a wireless reception section that receives wireless signals of the plurality of frequency channels; a quality determining section which determines, based on reception conditions of the wireless signals received by the wireless reception section, available frequency channels among the plurality of frequency channels, and which determines a usage sequence of the determined available frequency channels for a use in a communication; a beacon generating section that generates a beacon in which the usage sequence of the frequency channels is described; a channel configuration section that configures the frequency channels to be used, in accordance with the usage sequence of the frequency channels; a transmission data generating section that generates transmission data; a wireless transmission section that transmits, the beacon generated by the beacon generating section, and the transmission data generated by the transmission data generating section, to one or more terminal devices as wireless signals by using the frequency channels configured by the channel configuration section; a timing control section that controls the wireless transmission section regarding a timing of a transmission of the wireless signals; and an antenna that transmits and receives the wireless signals via the wireless reception section and the wireless transmission section.

Furthermore, a superframe period, which represents a repeat cycle of the wireless communication, includes an active period in which the wireless communication is conductible, and a non-active period in which the wireless communication is not conducted. The timing control section divides the active period into a plurality of beacon periods as cycle units for transmitting the beacon to the one or more terminal devices, and the beacon is transmitted in each of the plurality of beacon periods.

The channel configuration section switches the frequency channels to be used in each of the plurality of beacon periods, in accordance with the usage sequence of the frequency channels.

Each of the beacon periods is divided into a period in which the beacon is transmitted, and an access period in which transmission and reception of data to and from the one or more terminal devices are conductible. When a transmission of a wireless signal fails in the access period of a current beacon period, the wireless transmission section retransmits the wireless signal in the access period of a next beacon period.

Preferably, the quality determining section determines frequency channels which are minimally affected by an interference wave as the available frequency channels among the plurality of frequency channels, based on the reception condition of the wireless signals received by the wireless reception section.

Preferably, the quality determining section removes, when notified by the one or more terminal devices via the wireless reception section about a frequency channel that is determined to have an inferior quality, the notified frequency channel from the usage sequence of the frequency channels.

Preferably, a carrier sense period is provided prior to the active period in the superframe period; and the quality determining section performs a carrier sense in the carrier sense period by sequentially switching through all the plurality of frequency channels and by measuring an electrical power of each of the frequency channels.

Furthermore, a batch carrier sense period may be provided prior to the active period in the superframe period; and the quality determining section may perform a carrier sense in the batch carrier sense period by conducting a frequency analysis of the plurality of frequency channels in a batch.

Furthermore, a terminal device, which is one mode of the present invention and which solves the conventional problem, is directed toward a terminal device that conducts, within a wireless network that includes a control device which controls a wireless communication by using a plurality of frequency channels, a wireless communication with the control device by using either one of the plurality of frequency channels in accordance with a control of the control device. The terminal device according to the present invention includes: a wireless reception section that receives, from the control device as a wireless signal, a beacon in which a usage sequence of available frequency channels among the plurality of frequency channels is described; a channel configuration section that configures a frequency channel to be used, in accordance with the usage sequence which is of the frequency channels and which is described in the beacon; a quality determining section that determines, based on a reception condition of the wireless signal received by the wireless reception section, a quality of the frequency channel that is used for a communication with the control device; a control section that instructs, when the quality determining section determines that the quality of the frequency channel is inferior, the channel configuration section to switch the frequency channel to be used based on the usage sequence which is of the frequency channels and which is described in the beacon received from the control device; a transmission data generating section that generates transmission data; a wireless transmission section that transmits the transmission data generated by the transmission data generating section to the control device as a wireless signal, by using the frequency channel configured by the channel configuration section; and an antenna that transmits and receives the wireless signal via the wireless reception section and the wireless transmission section.

Preferably, the control section notifies, via the wireless transmission section, the control device about a frequency channel that is determined to have an inferior quality by the quality determining section.

Preferably, the quality determining section determines a frequency channel that is largely affected by an interference wave as the frequency channel that has an inferior quality, based on the reception condition of the wireless signal received by the wireless reception section.

The channel configuration section switches the frequency channel to be used in each beacon period, in accordance with the usage sequence which is of the frequency and which is included in the beacon.

Advantageous Effects of Invention

As described above, since a control device according to embodiments of the present invention transmits, to a terminal device while changing a frequency channel in each beacon period, a beacon in which a usage sequence of available frequency channels is described; the control device can notify the terminal device about the usage sequence of the frequency channels. As a result, even when a quality of the frequency channel in use is inferior, the terminal device can predict and change to a frequency channel that will be used next, based on the beacon notified by the control device. Therefore, even if a communication between the control device and the terminal device is disrupted due to an influence of an interference wave and the like, the communication can be resumed in a next beacon period.

BRIEF DESCRIPTION OF DRAWINGS

FIG. 3 is a block diagram showing one example of a configuration of terminal devices 102 to 104 according to embodiment 1 of the present invention.

FIG. 4 is a schematic diagram showing a superframe period according to embodiment 1 of the present invention.

FIG. 12 is a schematic diagram showing one example of a configuration of another channel-usage sequence 524 according to embodiment 1 of the present invention.

FIG. 14 is a schematic diagram showing a frequency channel switching in a superframe unit according to embodiment 1 of the present invention.

FIG. 15 is a flowchart showing a process of the control device 101 according to embodiment 1 of the present invention.

DESCRIPTION OF EMBODIMENTS

Embodiments of the present invention will be described in the following with reference to figures.

Embodiment 1

Figure 1:
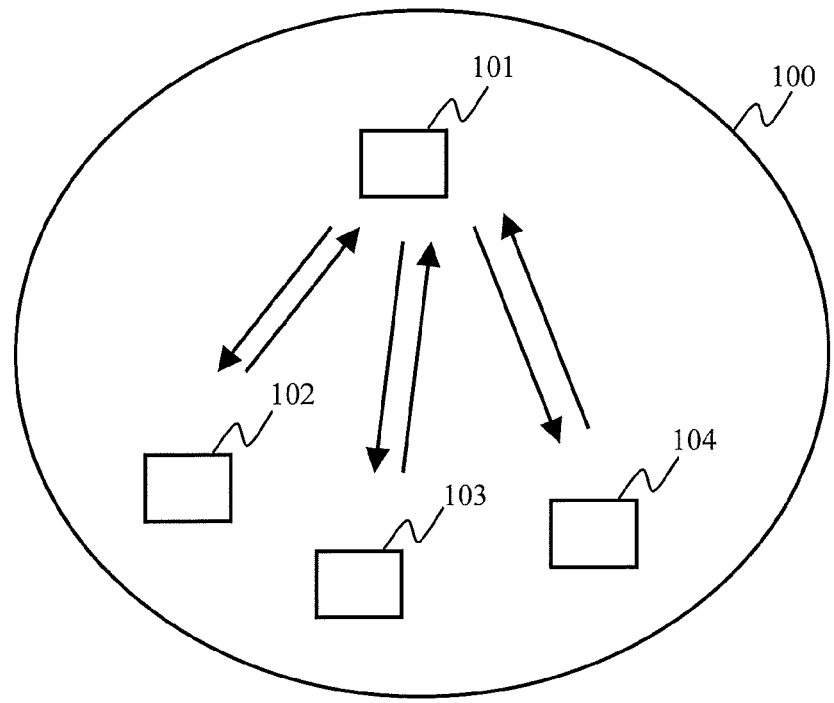
FIG. 1 is a figure showing one example of a configuration of a wireless network 100 according to embodiment 1 of the present invention.

FIG. 1 is a figure showing one example of a configuration of a wireless network 100 according to embodiment 1 of the present invention. In FIG. 1, the wireless network 100 includes a control device 101 and terminal devices 102 to 104. The number of the terminal devices 102 to 104 may be an arbitrary number as long as it is one or more. The control device 101 is a wireless communication terminal that controls a communication within the wireless network 100. The terminal devices 102 to 104 are wireless communication terminals that conduct wireless communications with the control device 101 in accordance with a control of the control device 101. In addition, a configuration that combines the control device 101 and the terminal devices 102 to 104 can be described as a communication system.

Figure 2:
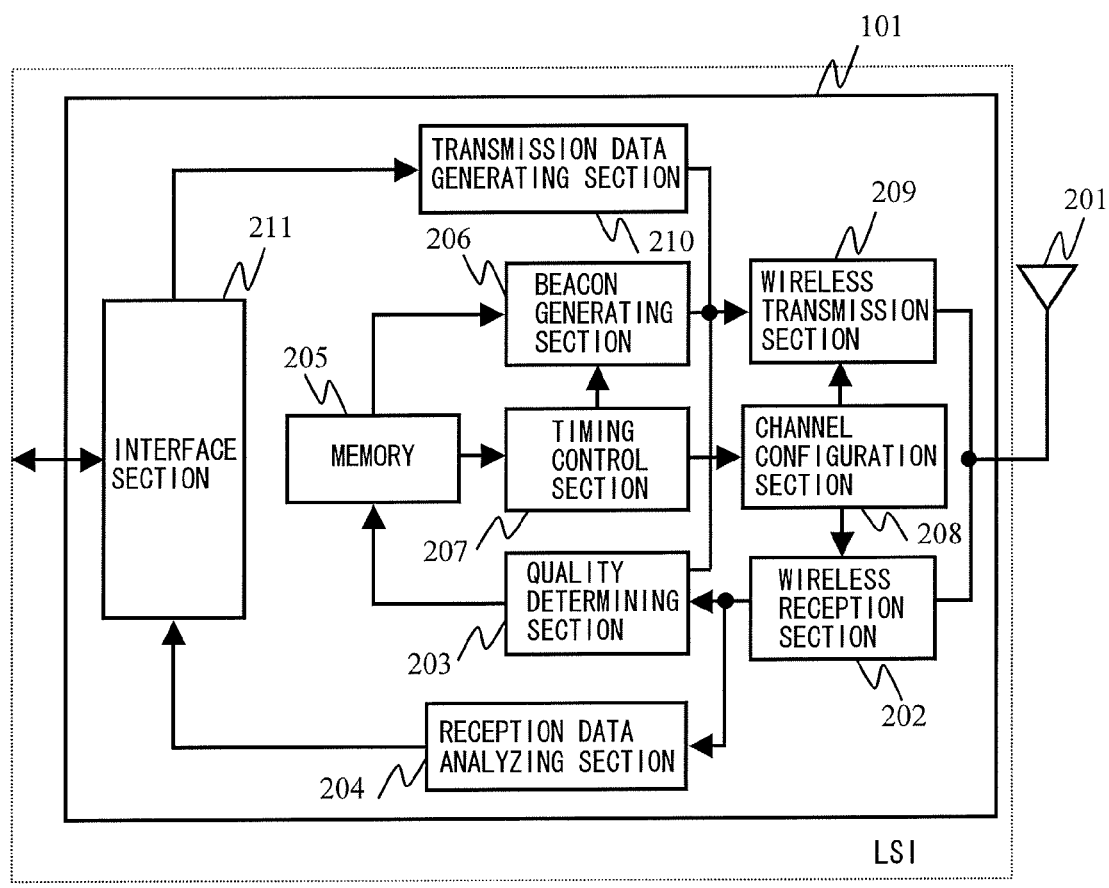
FIG. 2 is a block diagram showing one example of a configuration of a control device 101 according to embodiment 1 of the present invention.

FIG. 2 is a block diagram showing one example of a configuration of the control device 101 according to embodiment 1 of the present invention. In FIG. 2, the control device 101 includes: an antenna 201; a wireless reception section 202; a quality determining section 203; a reception data analyzing section 204; a memory 205; a beacon generating section 206; a timing control section 207; a channel configuration section 208; a wireless transmission section 209; a transmission data generating section 210; and an interface section 211.

The wireless reception section 202 conducts a demodulation process on a wireless signal received by the antenna 201, and outputs a reception frame. A data frame, an ACK frame, and the like are types of the reception frame. The quality determining section 203 determines a quality (e.g. transmission path condition, influences of an interference wave) of each frequency channel, by measuring a reception condition (e.g. received power, reception quality) of the reception frame demodulated by the wireless reception section 202. Furthermore, when the quality determining section 203 determines that the reception frame is safely received, the quality determining section 203 instructs the wireless transmission section 209 to respond with an ACK frame. The reception data analyzing section 204 analyzes the reception frame demodulated by the wireless reception section 202, and extracts and outputs reception data. The memory 205 stores: control information regarding the wireless network 100 managed by the control device 101; and quality information of each of the available frequency channels obtained by the quality determining section 203. Here, the control information is information necessary to control the communication within the wireless network 100; and is information that includes a later described superframe period, a beacon period, the number of beacon periods, a channel-usage sequence, and the like.

The beacon generating section 206 retrieves the control information, the quality information of each of the frequency channels, and the like, which are stored in the memory 205; and generates a beacon frame in which that information are described. The timing control section 207 controls a timing of a transmission of the beacon frame that is periodically transmitted. The channel configuration section 208 configures a frequency channel in which transmission and reception of a wireless signal are conducted. The wireless transmission section 209 generates a wireless signal by modulating the beacon frame, a transmission data frame, the ACK frame, and the like; and conducts a wireless transmission via the antenna 201. The transmission data generating section 210 generates the transmission data frame based on transmission data inputted from the interface section 211. The interface section 211 is an interface for inputting and outputting the transmission data and the reception data.

FIG. 3 is a block diagram showing one example of a configuration of the terminal devices 102 to 104 according to embodiment 1 of the present invention. In FIG. 3, the terminal devices 102 to 104 include: an antenna 221; a wireless reception section 222; a quality determining section 223; a reception data analyzing section 224; a memory 225; a control section 226; a channel configuration section 227; a wireless transmission section 228; a transmission data generating section 229; and an interface section 230.

The wireless reception section 222 conducts a demodulation process on a wireless signal received by the antenna 221, and outputs a reception frame. A beacon frame; a data frame, an ACK frame, and the like are types of the reception frame. The quality determining section 223 determines a quality (e.g. transmission path condition, influences of an interference wave) of a frequency channel, by measuring a reception condition (e.g. received power, reception quality) of the reception frame demodulated by the wireless reception section 222. Furthermore, when the quality determining section 223 determines that the reception frame is safely received, the quality determining section 223 instructs the wireless transmission section 228 to respond with an ACK frame. The reception data analyzing section 224 analyzes the reception frame demodulated by the wireless reception section 222, and outputs reception data. The memory 225 stores: control information regarding the wireless network 100 obtained by having the reception data analyzing section 224 analyze the beacon frame transmitted by the control device 101; and quality information of each of the frequency channels obtained by the quality determining section 223.

The control section 226 controls a timing of transmission and selects a frequency channel, based on the control information and the quality information of the frequency channel, which are stored in the memory 225. The channel configuration section 227 configures a frequency channel in which the transmission and reception of a wireless signal are conducted. The wireless transmission section 228 generates a wireless signal by modulating the transmission data frame, the ACK frame, and the like; and transmits the wireless signal via the antenna 221. The transmission data generating section 229 generates the transmission data frame based on transmission data inputted from the interface section 230. The interface section 230 is an interface for inputting and outputting the transmission data and the reception data.

The control device 101 periodically transmits the beacon frame that includes the control information regarding the wireless network 100. FIG. 4 is a schematic diagram showing, in a chronological order, a cycle for transmitting the beacon frame. Referring to FIG. 4, the longest cycle is a superframe period. The superframe period includes an active period in which a wireless communication is conducted, and a non-active period in which a wireless communication is not conducted. During the non-active period, since the control device 101 and the terminal devices 102 to 104 can suppress a power consumption of a functional block necessary for the wireless communication to a minimum; power consumptions of the control device 101 and the terminal devices 102 to 104 can be suppressed by providing the non-active period. Furthermore, the active period is divided into a plurality of beacon periods (beacon intervals) as cycle units in which the control device 101 transmits the beacon frame.

In FIG. 4, eight beacon periods are provided in the active period. In FIG. 4, although the configuration of the superframe period is described in a chronological order, the control device 101 and the terminal devices 102 to 104 can conduct the wireless communication by switching a plurality of frequency channels, and are conducting communication by switching the frequency channel in each beacon period.

Figure 5:
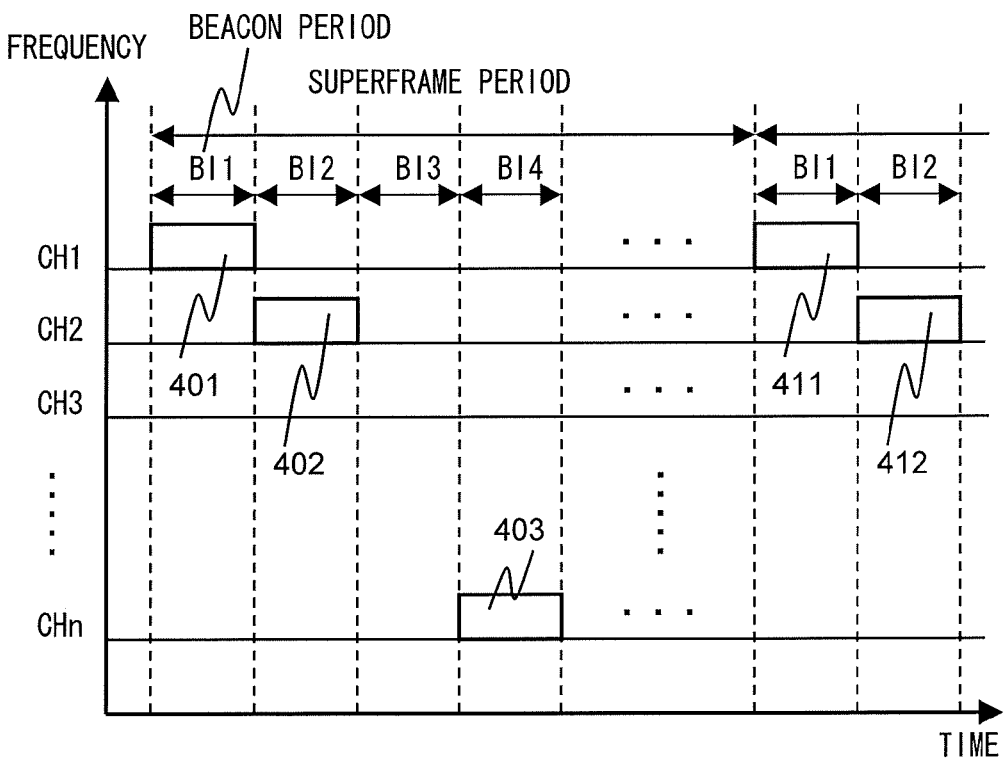
FIG. 5 is a schematic diagram showing an allocation of a frequency channel to the beacon period according to embodiment 1 of the present invention.

FIG. 5 is a schematic diagram showing an allocation of the frequency channel to the beacon period, when the frequency channel is switched in the beacon period unit. In FIG. 5, the control device 101 assigns a frequency channel CH1 and arranges a wireless communication period 401, to a period of a beacon period BI1 in the superframe period. Similarly, to a period of a beacon period BI2, a frequency channel CH2 is assigned and a wireless communication period 402 is arranged; and to a period of a beacon period BI4, a frequency channel CHn is assigned and a wireless communication period 403 is arranged. When a superframe period ends and a next superframe period starts, once again, to the period of the beacon period BI1, the frequency channel CH1 is assigned and a wireless communication period 411 is arranged; and to the period of the beacon period BI2, the frequency channel CH2 is assigned and a wireless communication period 412 is arranged. Subsequently, the control device 101 repeats the same frequency channel assignment for each superframe period.

In FIG. 5, for example, when the terminal device 102 communicates in the frequency channel CH1, the terminal device 102 is activated only in the beacon period BI1. Next after the wireless communication period 401, the terminal device 102 communicates in an access period within the wireless communication period 411 by CSMA, and does not conduct a wireless communication in a period between the wireless communication period 401 and the wireless communication period 411; therefore, as similar to the non-active period, the power consumption of the functional block necessary for the wireless communication can be suppressed to a minimum.

Figure 6:
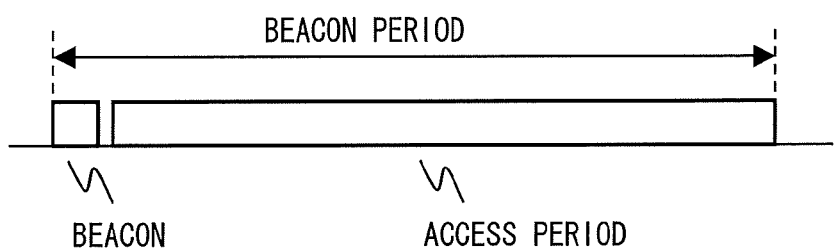
FIG. 6 is a schematic diagram showing a configuration of the beacon period according to embodiment 1 of the present invention.

FIG. 6 is a schematic diagram showing a configuration of the beacon period. Referring to FIG. 6, in the beacon period: first, the control device 101 transmits the beacon frame that includes control information of the wireless network 100; and then, the access period follows. During this access period, the wireless communication terminals including the control device 101 can conduct a wireless communication. It is described in the following that each of the wireless communication terminals conducts the wireless communication by CSMA (Carrier Sense Multiple Access) within this access period. A wireless access method is not limited to CSMA, and other wireless access methods such as ALOHA, TDMA, and the like can also be used.

Figure 7:
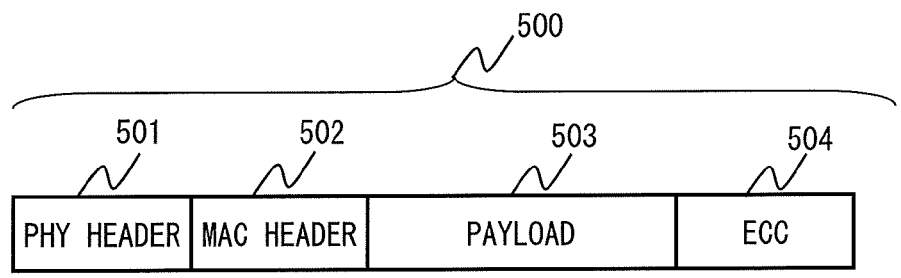
FIG. 7 is a schematic diagram showing a format of a wireless frame 500 according to embodiment 1 of the present invention.

FIG. 7 is a figure showing a format of a wireless frame 500 that is transmitted by each of the wireless communication terminals in the access period. Referring to FIG. 7, the wireless frame 500 includes: a PHY (Physical Layer) header 501 including codes necessary for demodulating the wireless signal, such as a bit synchronization code, a frame synchronization code, and the like; a MAC (Media Access Control) header 502 including a frame type and address information; and an error correcting code (ECC) 504 for detecting whether or not the wireless frame 500 and a payload 503 that stores information to be transmitted to a communication partner have been safely transmitted.

Figure 8:
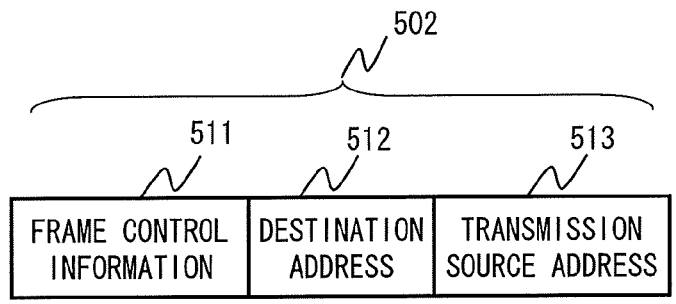
FIG. 8 is a schematic diagram showing a format of a MAC header 502 according to embodiment 1 of the present invention.

In addition, as shown in FIG. 8, the MAC header 502 includes: a frame control information 511 that indicates a frame type; a destination address 512; and a transmission source address 513. The frame type includes: a data frame for conducting transmission and reception of data; the ACK frame which is a response provided when the data frame and the like are received safely; and the beacon frame for transmitting the control information to the terminal devices 102 to 104 in the wireless network 100.

A method for conducting a wireless communication in the wireless network 100 configured as above, between the control device 101 and the terminal devices 102 to 104, will be described.

Figure 9:
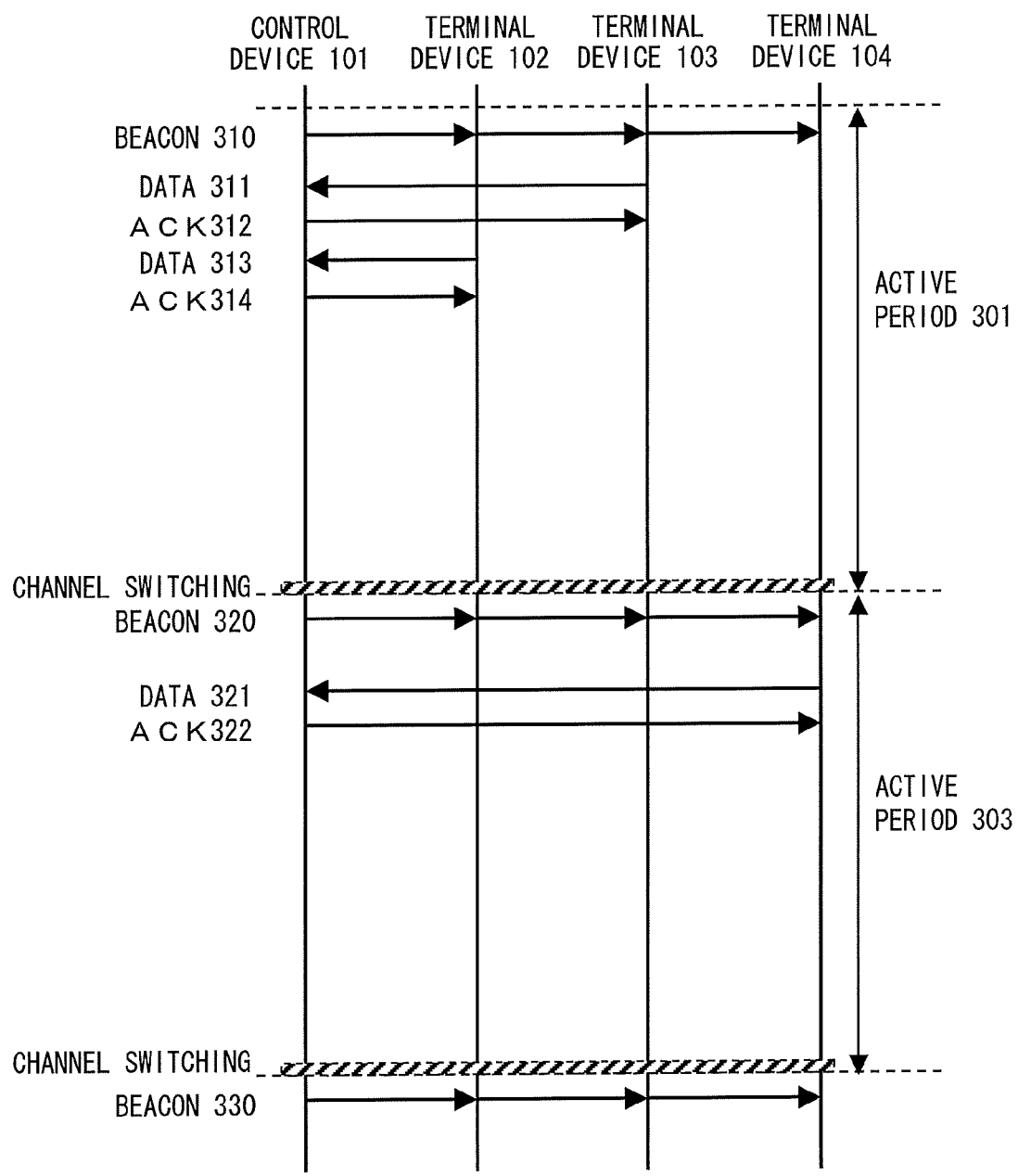
FIG. 9 is a figure showing one example of a communication sequence according to embodiment 1 of the present invention.

FIG. 9 is a figure showing one example of a communication sequence between the control device 101 and the terminal devices 102 to 104. In FIG. 9, when the active period begins, first, the control device 101 delivers a beacon frame 310 to the terminal devices 102 to 104 in the wireless network 100. In this case, in the format of the wireless frame 500, a code that indicates a beacon frame is given as the frame type to the frame control information 511 (refer FIG. 8). Additionally, a beacon payload is inserted in the payload 503 (refer FIG. 7).

Figure 10:
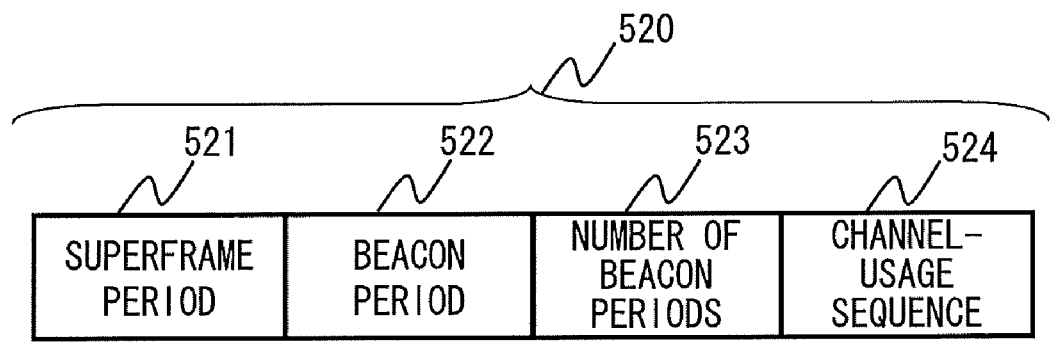
FIG. 10 is a schematic diagram showing a beacon payload 520 according to embodiment 1 of the present invention.

FIG. 10 shows a format of a beacon payload 520. In FIG. 10, the beacon payload 520 includes: a superframe period 521; a beacon period 522; the number of beacon periods 523; and a channel-usage sequence 524. The superframe period 521 and the beacon period 522 are similar to the superframe period and the beacon period described in FIG. 4 and FIG. 5. In addition, the active period in FIG. 4 and FIG. 5 can be calculated by multiplying the beacon period 522 to the number of beacon periods 523. Furthermore, the non-active period can be calculated by subtracting the active period from the superframe period 521.

Figure 11:
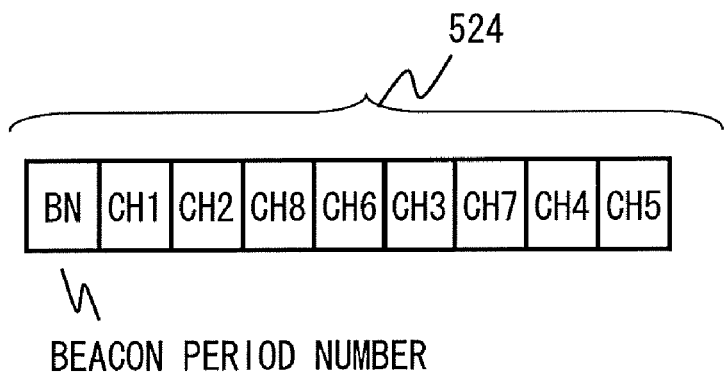
FIG. 11 is a schematic diagram showing one example of a configuration of a channel-usage sequence 524 according to embodiment 1 of the present invention.

FIG. 11 is a figure showing one example of a configuration of the channel-usage sequence 524. In FIG. 11, a beacon period number BN is arranged at the beginning of the channel-usage sequence 524, and, following the beacon period number BN, frequency channels that are used in the beacon period unit are sequentially arranged. In the example shown in FIG. 11, the number of beacon periods is eight, and the frequency channels are use in a sequence of CH1, CH2, CH8, CH6, CH3, CH7, CH4, and CH5. Here, when the beacon period number BN is 1, this indicates that the frequency channel in use in the current beacon period is CH1, and it can be understood that the frequency channel which will be used in the next beacon period is CH2, and the frequency channel which will be used in the beacon period immediately after the next beacon period is CH8. Similarly, when the beacon period number BN is 2, the frequency channel in use in the current beacon period is CH2, and it can be understood that the frequency channel which will be used in the next beacon period is CH8, and the frequency channel which will be used in the beacon period immediately after the next beacon period is CH6.

Although a configuration shown in FIG. 11 has been used as a configuration of the channel-usage sequence 524 in the beacon frame, a configuration shown in FIG. 12 may be used as another configuration. FIG. 12 is a figure showing one example of the configuration of the other channel-usage sequence 524. In the configuration shown in FIG. 12, instead of using the beacon period number BN, a frequency channel arranged in the first position constantly indicates the frequency channel that is currently in use, and the channel-usage sequence is rearranged every time the beacon period ends. Therefore, in every beacon period, it can be understood that, the channel at the beginning of the channel-usage sequence 524 is the channel that is currently in use, and the next is the frequency channel that will be used in the next beacon period. For example, in beacon period BI3, it can be understood that, the frequency channel in use in the current beacon period is CH8, the frequency channel which will be used in the next beacon period is CH6, and the frequency channel which will be used in the beacon period immediately after the next beacon period is CH3.

In addition to the superframe period, the beacon period, and the number of beacon periods, which are the control information regarding the wireless network 100; the control device 101 holds, in the memory 205, information regarding frequency channel availability, which is a quality information. The information regarding frequency channel availability is created by determining whether or not the frequency channel is available by measuring reception conditions (e.g. received power, reception quality) of all the frequency channels at a time point when the control device 101 establishes the wireless network 100. Additionally, the control device 101: judges the availability of the frequency channel based on information such as conditions of communications with the terminal devices 102 to 104 in a channel obtained as a result of switching in each of the beacon periods, and a duration time of a reception incapable state due to a carrier sense; and updates the information regarding frequency channel availability at any time.

The control device 101: selects, based on the information regarding frequency channel availability, the available frequency channels depending on the number of beacon periods; randomly selects a frequency channel from the available frequency channels; determines the channel-usage sequence; and holds the channel-usage sequence as the control information in the memory 205. The control device 101: retrieves, from the memory 205, the superframe period, the beacon period, the number of beacon periods, and the channel-usage sequence; and creates the beacon frame in the format type of the payload 520 shown in FIG. 10. At this time point, the beacon period number in the channel-usage sequence within the beacon frame is 1. The beacon frame is modulated by the wireless transmission section 209, and transmitted via the antenna 201.

In FIG. 9, for the communication with the control device 101, the terminal device 102 and the terminal device 103 use the frequency channel CH1 during an active period 301, and the terminal device 104 uses the frequency channel CH2 during an active period 303. Since the terminal device 102 and the terminal device 103 are in an active state during the active period 301, the terminal device 102 and the terminal device 103 receive a beacon 310 transmitted by the control device 101. When the beacon 310 is safely received, the terminal device 102 and the terminal device 103 analyze the payload in the beacon frame, and stores, in the memory 225, the control information that includes the channel-usage sequence.

Next, the terminal device 103 that holds the transmission data performs a carrier sense, and transmits a data frame 311. The control device 101, which has safely received the data frame 311, transmits an ACK frame 312 to the terminal device 103 as a safe-reception response. Similarly, the terminal device 102 that holds the transmission data performs a carrier sense, and transmits a data frame 313. The control device 101, which has safely received the data frame 313, transmits an ACK frame 314 to the terminal device 102 as a safe-reception response. When the active period ends, the control device 101 sets a time in a timer, which time is obtained by subtracting a time required for activation and a time required for switching the frequency channel from an end time of the non-active period; and enters a sleep mode by blocking a supply of power to the functional block that is necessary for the wireless communication. Similarly, the terminal device 102 and the terminal device 103 set a start time of the superframe period in a timer, and enter a sleep mode.

Before the end of the non-active period, the timer elapses and the control device 101: resumes the supply of power to the functional block necessary for the wireless communication; reactivates itself; and switches the frequency channel to CH2. Furthermore, the control device 101 transmits a beacon frame 320 at a start timing of the active period 303. At this moment, the beacon period number of the channel-usage sequence in the beacon frame 320 is 2. When the terminal device 104, which is active during the active period 303, safely receives the beacon frame 320, the terminal device 104 analyzes the payload in the beacon frame 320, and stores, in the memory 225, the control information that includes the channel-usage sequence and the like. Next, the terminal device 104 that holds the transmission data performs a carrier sense, and transmits a data frame 321. The control device 101, which has safely received the data frame 321, transmits an ACK frame 322 to the terminal device 104 as a safe-reception response. Subsequently, a similar sequence is repeated.

Figure 13:
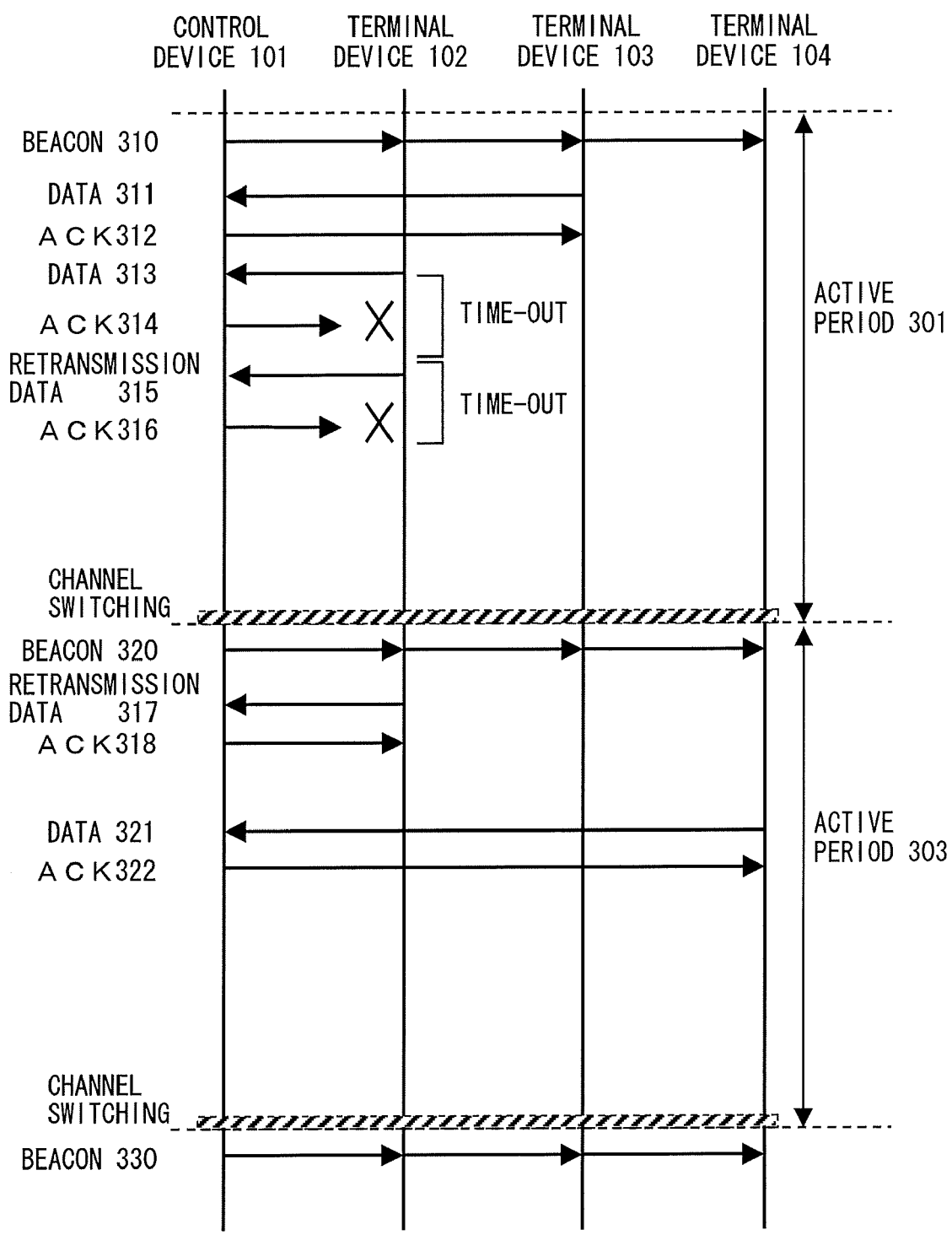
FIG. 13 is a figure showing one example of a communication sequence according to embodiment 1 of the present invention when a frequency channel is switched.

Describe next with reference to FIG. 13 is a switching sequence of the frequency channel when an interference is generated on the terminal devices 102 to 104 sides. Since, the transmission of the beacon frame 310 by the control device 101, the transmission of the data frame 311 by the terminal device 103, and the reception of the ACK frame 312 by the terminal device 103, are similar to those in the case shown in FIG. 9, descriptions of these are omitted in FIG. 13. After transmitting the data frame 313, the terminal device 102 waits for an ACK frame response from the control device 101. When the control device 101 safely receives the data frame 313, the control device 101 transmits the ACK frame 314. However, at this moment, suppose an operation of another wireless communication terminal that uses the identical frequency channel in a periphery of the terminal device 102 starts, and interferes with the terminal device 102.

Here, the interference is not limited to an interference from a different wireless communication system that uses the identical frequency channel, but an interference from a wireless communication terminal that uses an adjacent frequency channel, and an electromagnetic interference from within ones' own station are also conceivable.

At this moment, the terminal device 102 cannot safely receive the ACK frame 314 due to an influence of this interference. When a time-out of a reception of the ACK frame 314 occurs, the terminal device 102 assumes that the data frame 313 has not been delivered to the control device 101, and retransmits a data frame that is identical to the data frame 313 as a retransmission data frame 315. Although the control device 101 safely receives the retransmission data frame 315 and transmits an ACK frame 316 once again, the terminal device 102 cannot safely receive the ACK frame 316 due to the influence of the interference again. When the terminal device 102 cannot receive an ACK frame from the control device 101 after repeating the retransmission of this data frame for a predefined number of times, terminal device 102 judges that a communication in the frequency channel CH1 that is currently in use is not possible due to an influence of some sort of an interference and the like.

Therefore, the terminal device 102 retrieves the channel-usage sequence in the memory 225, comprehends that the control device 101 will conduct a communication by using the frequency channel CH2 in the next beacon period, and enters a sleep mode for the moment. Immediately before the end of the active period 301, the terminal device 102 is reactivated, and the terminal device 102 switches to the frequency channel to CH2 and waits for a beacon frame that will be transmitted by the control device 101. When the control device 101 switches the frequency channel to CH2 and when the active period 303 begins, the control device 101 transmits the beacon frame 320.

When the terminal device 102 safely receives the beacon frame 320, the terminal device 102 analyzes the payload in the beacon frame 320, updates the control information that includes the channel-usage sequence, and stores the control information in the memory 225. Then, after performing a carrier sense, if the terminal device 102 judges that a wireless communication medium is in an idle mode, the terminal device 102 transmits a retransmission data frame 317, which is retransmission data of the data frame 313, to the control device 101.

At this moment, the terminal device 102 writes information regarding a change of the used frequency channel to the frame control information in the MAC header in the retransmitted dam frame 317, and notifies the control device 101 about the information. The control device 101 that has received the retransmission data frame 317 transmits, to the terminal device 102, an ACK frame 318 as a safe-reception response. Then, the control device 101: analyzes the received MAC header of the data frame 317, comprehends that the terminal device 102 has changed the frequency channel for use; and stores, in the memory 205, information regarding the fact that the terminal device 102 cannot use the frequency channel CH1. Subsequently, the control device 101 repeats an operation similar in FIG. 9 as a communication sequence with each of the terminal devices 102 to 104.

FIG. 14 is a timing diagram showing a way of how the terminal device 102 switches the frequency channel. Referring to FIG. 14, in the frequency channel CH1, after a beacon frame 431 is being transmitted, each of the wireless communication terminals 101 to 104 enters an access period in which a communication is conducted by CSMA. During this access period, although the terminal device 102 transmits a data frame 432, the terminal device 102 additionally retransmits the data frame 432 twice due to lack of a response as an ACK frame from the control device 101. At this moment, the terminal device 102 judges that the frequency channel CH1 cannot be used due to an influence of an interference and the like, and switches the frequency channel to CH2. After the control device 101 switches to the frequency channel CH2 and a beacon frame 433 is being transmitted, each of the wireless communication terminals 101 to 104 enters an access period in which a communication is conducted by CSMA. During this access period, the terminal device 102 transmits a data frame 434 which is a retransmission frame of the data frame 432, and receives an ACK frame 435 from the control device 101. With this, a communication between the control device 101 and the terminal device 102 at the frequency channel CH2 is established.

If the terminal device 102 continues conducting the retransmission without switching the frequency channel: either a communication will not be established with the control device 101 at all due to the interference of the influence and the like; or even when the retransmission of the data frame succeeds after waiting until the next superframe period, a retransmission delay for a duration of the superframe period is generated. However, according to embodiment 1 of the present invention, the transmission delay due to the retransmission will only be a duration of a Trd period shown in FIG. 14. The duration of the Trd period is at most a duration of two beacon periods, thus, the transmission delay can be greatly shortened.

Furthermore, if the terminal device 102 continues retransmitting the data frame until an ACK frame is received from the control device 101, without switching the frequency channel to CH1, an electrical power necessary for the transmission will be uselessly consumed until the end of the influence of the interference and the like. According to embodiment 1 of the present invention, an useless consumption of the electrical power can be avoided, since the used frequency channel is rapidly switched in order to avoid the influence of the interference and the like.

Next, internal processes of the control device 101 and the terminal devices 102 to 104, which process a processing sequence described above, will be described with reference to FIG. 15 to FIG. 19.

Figure 16:
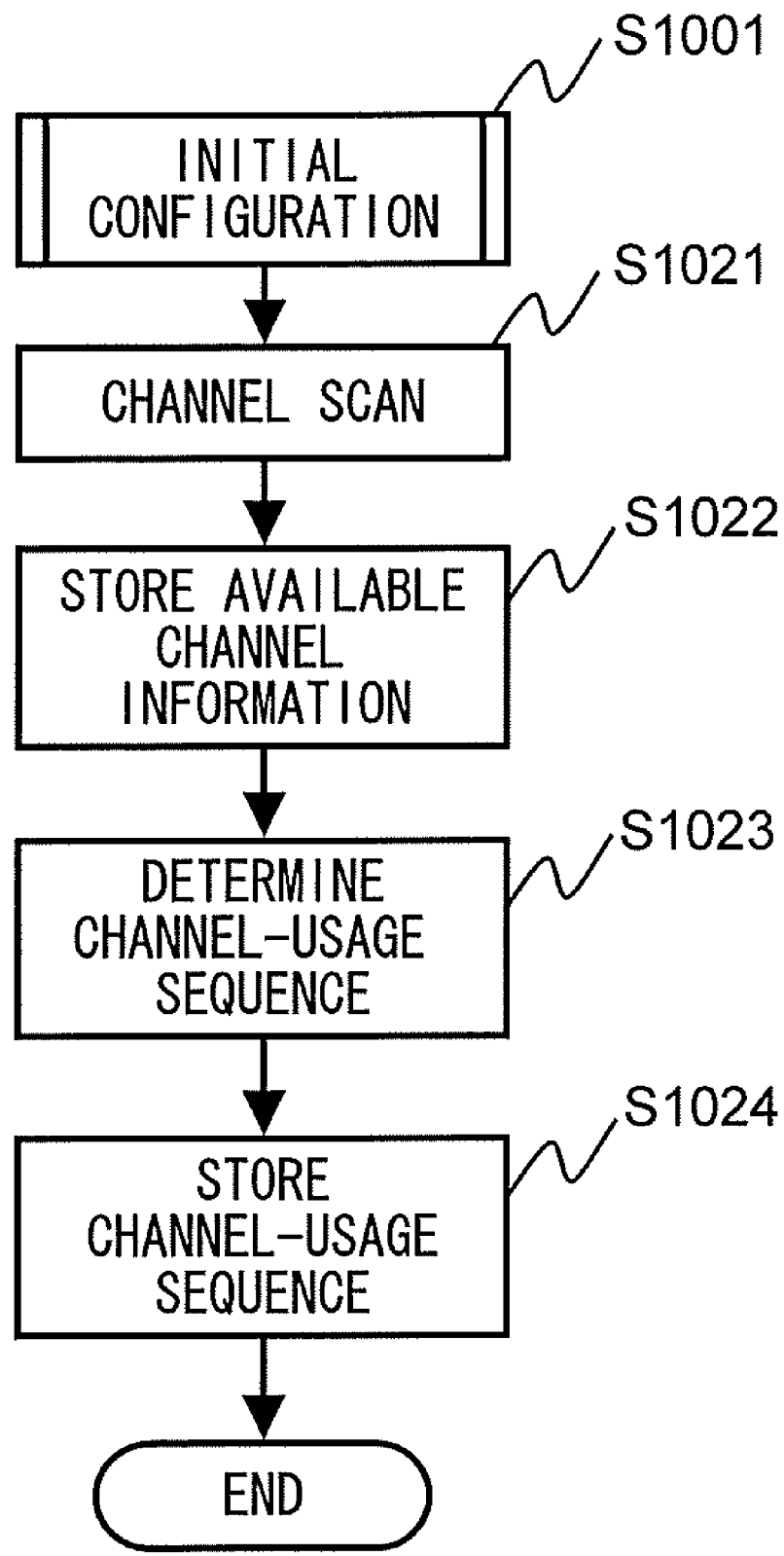
FIG. 16 is a flowchart showing one example of a process at the time of initialization of the control device 101 according to embodiment 1 of the present invention.

FIG. 15 is a figure showing one example of a process flow of the control device 101. FIG. 16 is a figure showing one example of a process flow at a time of initialization of the control device 101. At step S1001 in FIG. 15, the control device 101 executes an initial configuring process which is each of the steps S1021 to S1024 shown in FIG. 16. Referring to FIG. 16, at step S1021, the control device 101 obtains available frequency channels after sequentially scanning for usages by other wireless communication terminals or for an influence of an interference, in all the available frequency channels by conducting an electric power measurement and the like. At step S1022, the control device 101 stores, in the memory 205, information of the available frequency channels obtained at step 1021. Next, at step S1023, the control device 101 randomly selects a frequency channel from the available frequency channel based on the number of beacon periods that is held as control information, and determines the channel-usage sequence. At step S1024, the control device 101 stores the determined channel-usage sequence in the memory 205, and the initial configuring process ends.

Next, at step S1002 in FIG. 15, the control device 101 retrieves channel information which is held in the memory 205 and which is of the wireless network and which is such as the superframe period, the beacon period the channel-usage sequence, and the like. At step S1003, the control device 101 creates the beacon frame based on the channel information retrieved at step S1002. At step S1004, the control device 101 switches to the frequency channel which is first in the channel-usage sequence retrieved at S1002. At step S1005, to transmit the beacon frame at the beginning of the beacon period, the control device 101 performs a carrier sense in order to determine whether or not the wireless communication medium is in an idle mode. At step S1006, if the carrier sense performed at step S1005 has returned a level equal to or less than a predefined level, the control device 101 judges that a transmission of the beacon frame is possible, and executes steps S1011 and beyond.

If the carrier sense performed at step S1005 returned a level equal to or more than the predefined level, the frequency channel is used, and the control device 101 executes steps S1007 and beyond. At step S1007, if the wireless communication medium is not in an idle mode even after repeatedly conducting steps S1005 to S1006, the control device 101 judges that the current frequency channel is continuously used by another system or there is some sort of an influence of an interference, and judges that the frequency channel is unavailable. At step S1008, the control device 101 stores, in the memory 205, the current frequency channel as an unavailable channel. At step S1009, the control device 101 once again randomly selects a frequency channel from the available channels excluding the unavailable frequency channel, and re-determines the channel-usage sequence. At step S1010, the control device 101 stores the re-determined channel-usage sequence in the memory 205.

If the transmission of the beacon becomes possible at step S1006, the beacon frame is transmitted at step S1011. Subsequently, in order to conduct the transmission and reception of the data frame and the like between the control device 101 and the terminal devices 102 to 104, a data transmission process and a data reception process at steps S1012 to step S1015 are repeated. Each of the processes from step S1012 to step S1015 is repeated until the beacon period ends at step S1016; and when the beacon period ends, it returns to step S1002 and subsequent processes are repeated.

Figure 17:
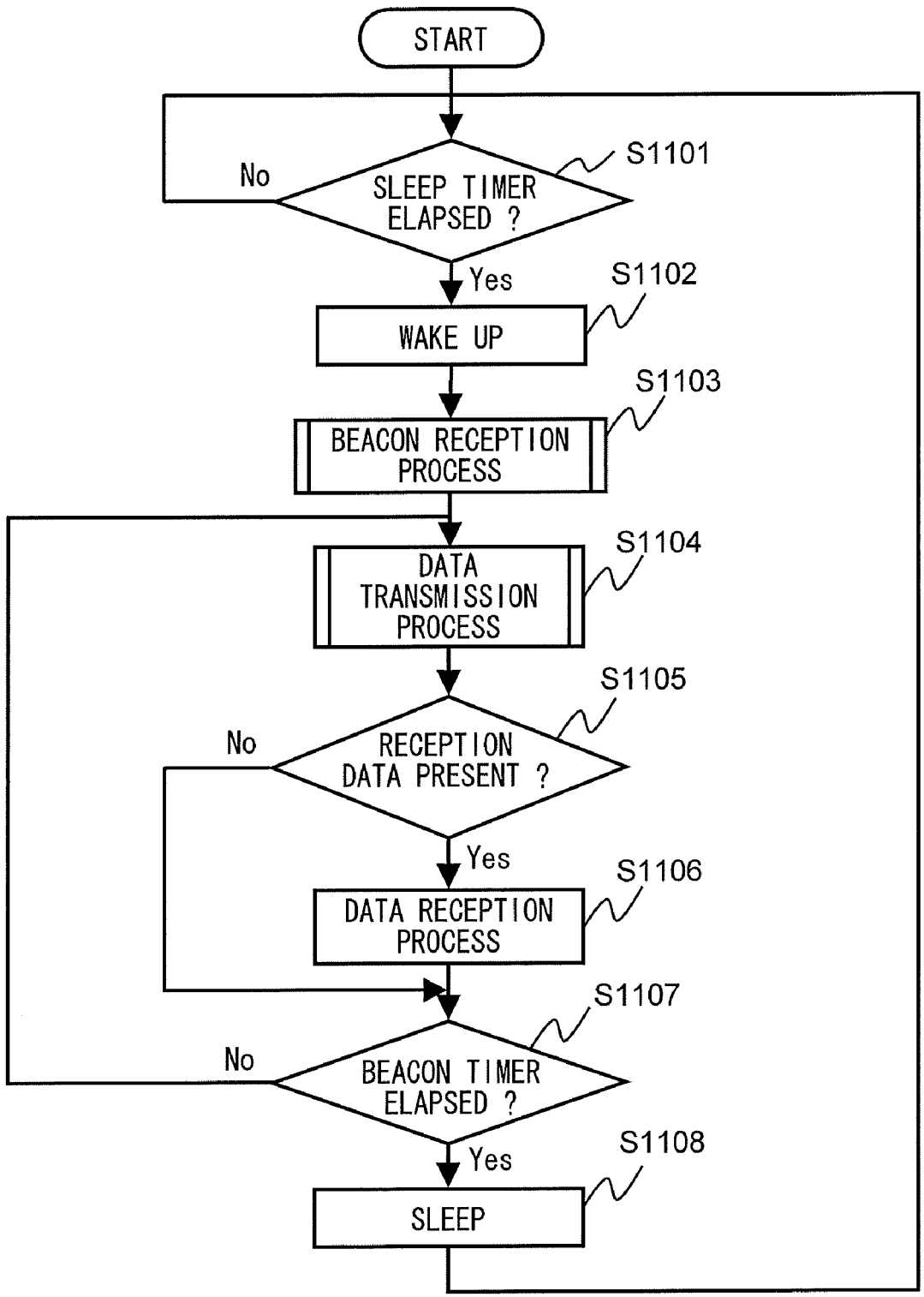
FIG. 17 is a flowchart showing one example of a process of the terminal devices 102 to 104 according to embodiment 1 of the present invention.
Figure 18:
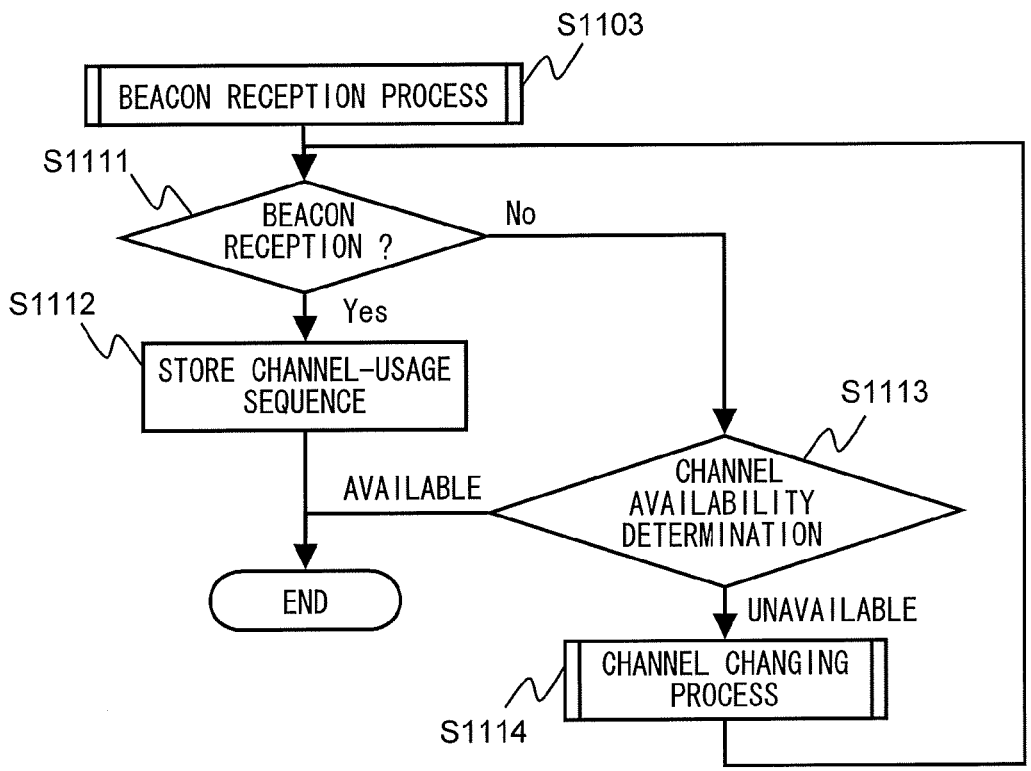
FIG. 18 is a flowchart showing one example of a beacon reception process by the terminal devices 102 to 104 according to embodiment 1 of the present invention.
Figure 19:
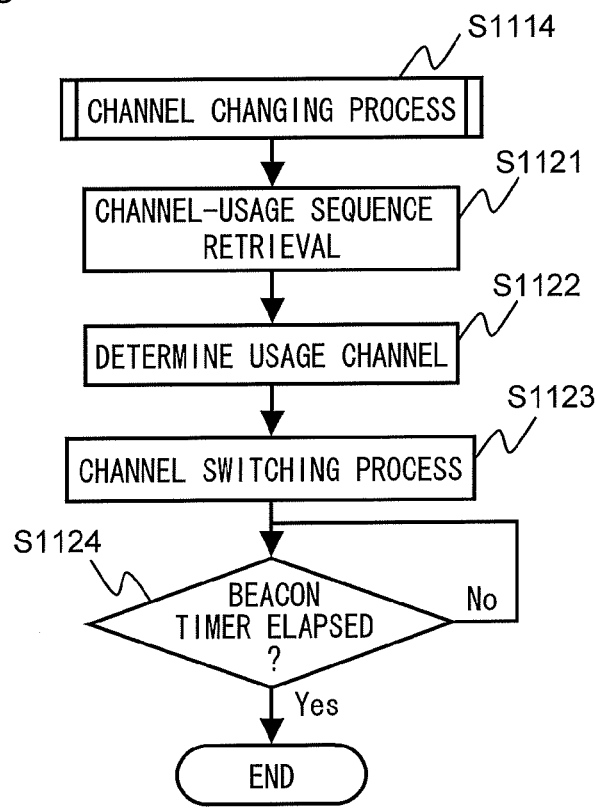
FIG. 19 is a flowchart showing one example a channel changing process by the terminal devices 102 to 104 according to embodiment 1 of the present invention.

FIG. 17 is a figure showing one example of a process flow of the terminal devices 102 to 104. FIG. 18 is a figure showing one example of a process flow of the terminal devices 102 to 104 at a time of a beacon reception. FIG. 19 is a figure showing a process flow of the terminal devices 102 to 104 at a time of a channel changing process.

Although not diagrammatically represented in the process flow, assumed in FIG. 17 is a case where, at the moment when the process starts, the terminal devices 102 to 104 have finished a process of joining the wireless network 100 with the control device 101, have recognized a timing of the superframe period and the beacon period, and have entered a sleep mode. When a sleep timer elapses at step S1101, the terminal devices 102 to 104 exit the sleep mode and are activated at step S1102. At step S1103, the terminal devices 102 to 104 conduct a reception process of the beacon.

A beacon reception process step S1103 will be described in detail with reference to FIG. 18. Referring to FIG. 18, when the terminal devices 102 to 104 safely receive the beacon frame at step S1111, the terminal devices 102 to 104 analyze the payload of the beacon frame at step S1112, extract the channel-usage sequence, and store the channel-usage sequence in the memory 225. With this, the terminal devices 102 to 104 update channel-usage sequence information. Furthermore, if the terminal devices 102 to 104 cannot safely receive the beacon frame at step S111, the terminal devices 102 to 104 conduct a channel availability determination at step S1113. A determination of a channel availability is conducted in the following manner: the frequency channel that is currently in use is determined to be unavailable, if the beacon frame cannot be received for a predefined number of times even at a beacon reception timing in each superframe period, or if, after failing to transmit a data frame for a predefined number of times during the beacon period, the beacon frame cannot be received even at the beacon reception timing.

When the terminal devices 102 to 104 judge that the frequency channel currently in use is unavailable, the terminal devices 102 to 104 conduct the channel changing process at step S1114. The channel changing process step S1114 will be described in detail with reference to FIG. 19. Referring to FIG. 19, first, at step S1121; the terminal devices 102 to 104 retrieve the channel-usage sequence in the memory 225. Next, at step S1122, the terminal devices 102 to 104: select the frequency channel of the beacon period, which frequency channel is described in the channel-usage sequence as the one next after the frequency channel currently in use; and switch to the frequency channel selected at step S1123. The terminal devices 102 to 104: wait until a beacon timer elapses at step S1124; end the channel changing process when the beacon timer elapses; and return to the beacon reception at step S1111. Here, a period until elapsing of the beacon timer may be a sleep mode.

Referring back to FIG. 17, when the beacon reception process at step S1103 ends, the terminal devices 102 to 104 repeatedly conduct the transmission process and the reception process of the data frame from step S1104 to step S1106, until the beacon timer elapses.

Figure 20:
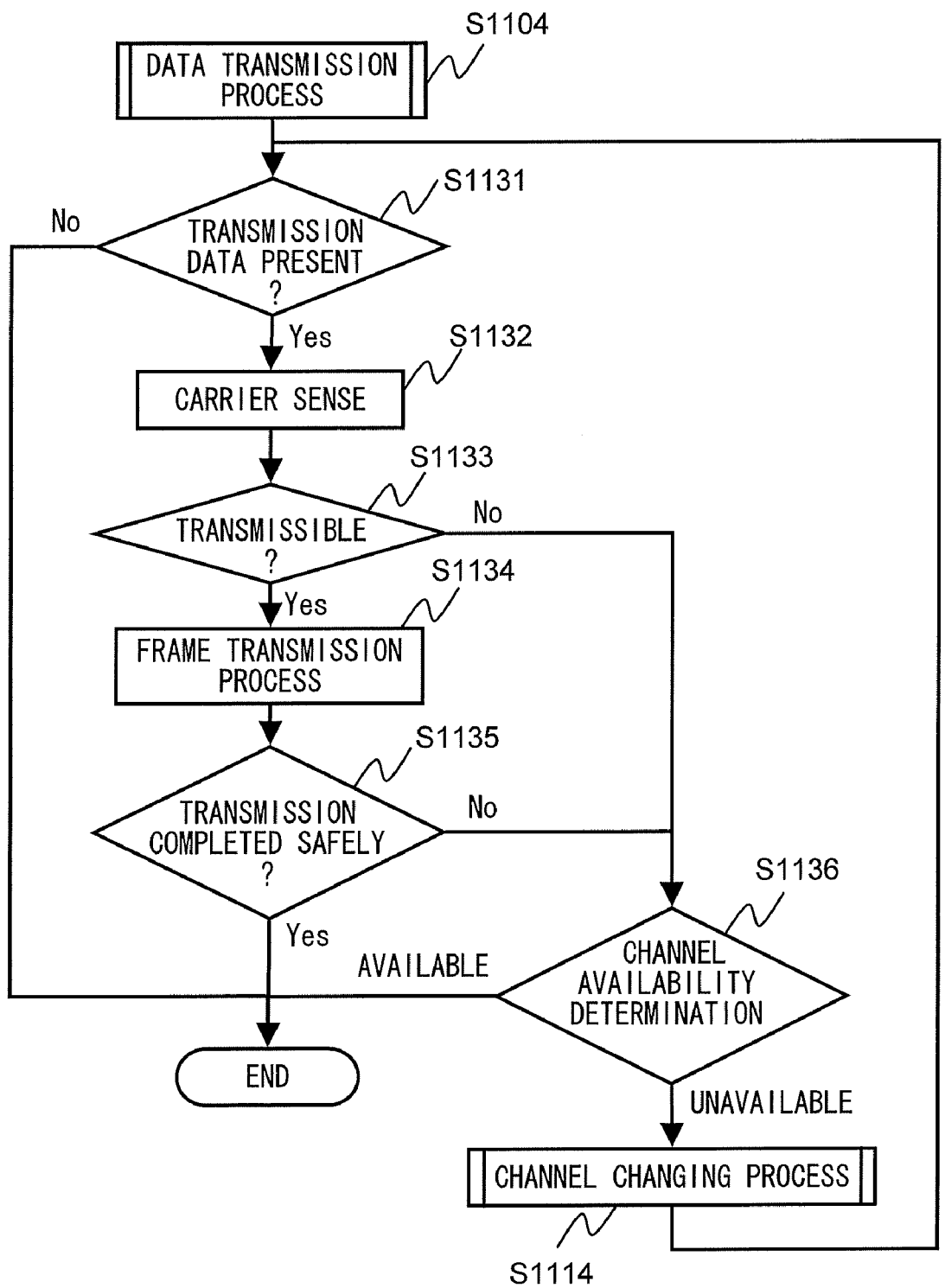
FIG. 20 is a flowchart showing one example of a data frame transmission process by the terminal devices 102 to 104 according to embodiment 1 of the present invention.

The data transmission process at step S1104 will be described next with reference to FIG. 20. Referring to FIG. 20, the terminal devices 102 to 104 create the data frame at step S1131 when there is an input of the transmission data from the interface section 230. Next, at step S1132, in order to judge whether or not the wireless communication medium is in an idle mode before starting the transmission of the data frame, the terminal devices 102 to 104 perform a carrier sense. At step S1133, when the terminal devices 102 to 104 judge that the wireless communication medium is in an idle mode as a result of the carrier sense at step S1132, the process flow proceeds to step S1134 and the terminal devices 102 to 104 conduct the transmission process of the data frame. At step S1135, the terminal devices 102 to 104 wait for a response of an ACK frame from the control device 101, and when the ACK frame is safely received, the data transmission process ends.

When the wireless communication medium is in an idle mode at step S1133, and when an ACK frame from the control device 101 cannot be received at step S1135, the process flow proceeds to step S1136 and the terminal devices 102 to 104 determine the availability of the frequency channel currently in use. Cases where the frequency channel currently in use is determined to be unavailable at step S1136 are: a case where results of the carrier sense have been continuously "not transmittable" for a plurality of times; and a case where an ACK frame from the control device 101 cannot be received even after continuously transmitting the data frame for a plurality of times. When the frequency channel currently in use is unavailable, the process flow proceeds to step S1114 and the terminal devices 102 to 104 conduct the channel changing process. The channel changing process at step S1114 is similar to that described with reference to FIG. 19.

Lastly, when the beacon tinier elapses at step S1107, the terminal devices 102 to 104 enter a sleep mode at step S1108, and stay in the sleep mode until the sleep timer elapses at step S1101. With the process described above, the terminal devices 102 to 104 can avoid an influence of an interference and the like by rapidly switching the used frequency channel.

As described above, the control device 101 according to embodiment 1 of the present invention can notify the terminal devices 102 to 104 about the usage sequence of the frequency channels, by changing the frequency channel in each beacon period, and by transmitting, to the terminal devices 102 to 104, the beacon in which the usage sequence of the available frequency channels is described. As a result, even when the quality the frequency channel in use is inferior, the terminal devices 102 to 104 can predict, and change to, the frequency channel that will be used next, based on the beacon notified by the control device 101. Therefore, even if the communication between the control device 101 and the terminal devices 102 to 104 is disrupted due to the influence of the interference wave and the like, the communication can be resumed in the next beacon period.

Embodiment 2

Figure 21:
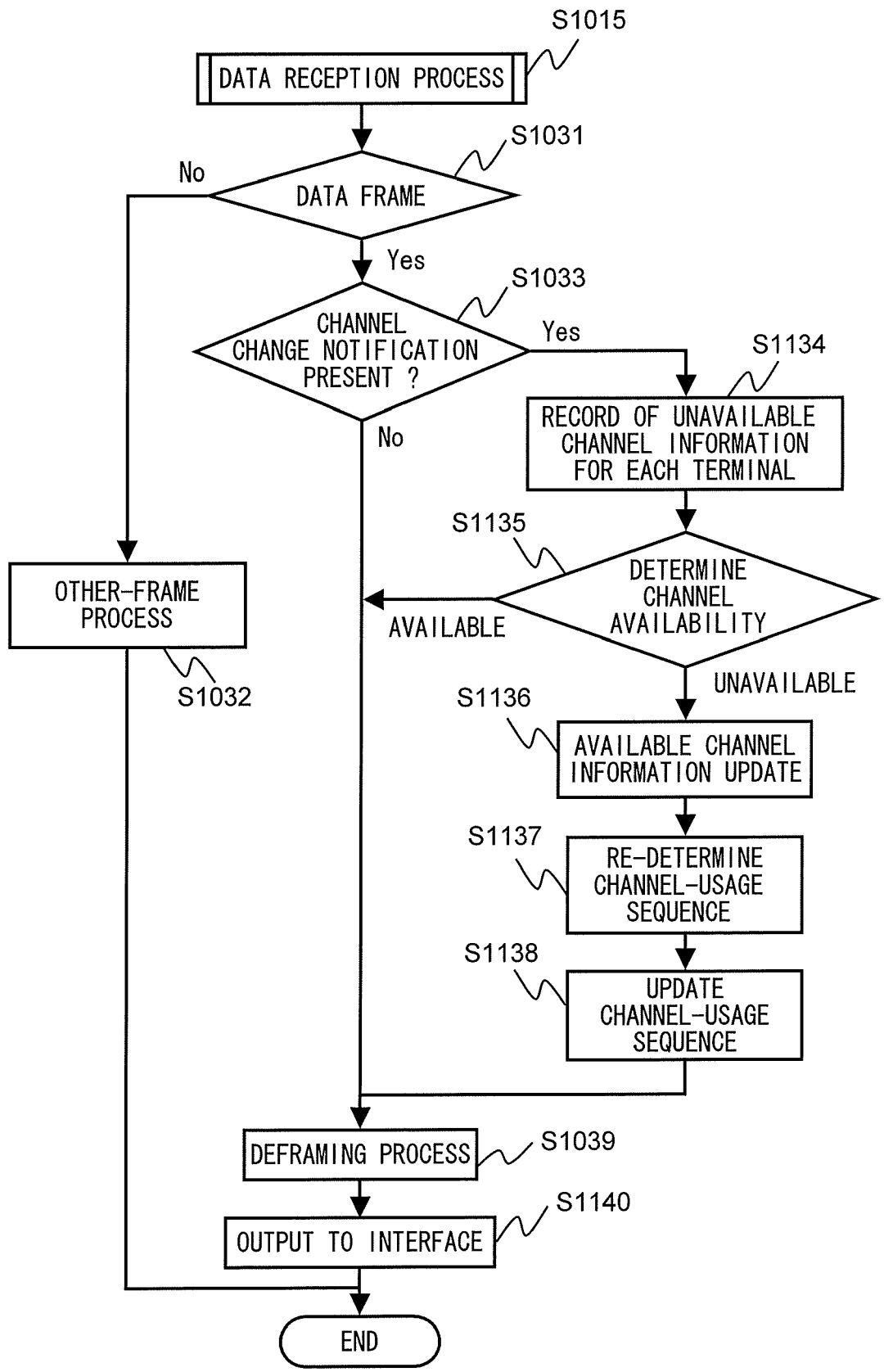
FIG. 21 is a flowchart showing one example of a data reception process by the control device 101 according to embodiment 2 of the present invention.

FIG. 21 is a figure showing one example of a process flow of the data reception process by the control device 101 according to embodiment 2 of the present invention. Other processes by the control device 101 are similar to those in the process flow according to embodiment 1 of the present invention, processes similar to those in the process flow shown in FIG. 15 and FIG. 16 are conducted, while only the data reception process at step S1015 is different.

In FIG. 21, when the control device 101 receives a frame from the terminal devices 102 to 104 at step S1031, the control device 101 determines whether it is a data frame or not. When the received frame is not a data frame, the process flow proceeds to step S1032, the control device 101 conducts a process of the other-frame, and ends the process. When the received frame is a data frame, the process flow proceeds to step S1033. At this point, if the terminal devices 102 to 104 have switched the frequency channel from that of the preceding beacon period, such information will be described in the MAC header of the data frame. Thus, the control device 101 determines whether there is a channel change notification at step S1033. If there are no channel change notifications, the process flow proceeds to step S1039, and the control device 101 extracts a reception data from the received data frame, and outputs the reception data to the interface section 211 after the process flow proceeds to step S1140.

At step S1033, if there is a channel change notification from the terminal devices 102 to 104, the process flow proceeds to step S1134; and addresses of those terminal devices 102 to 104, and unavailable channel information of those terminal devices 102 to 104 are recorded. At step S1135, the control device 101: retrieves the unavailable channel information of all the terminal devices 102 to 104; calculates a cumulative total thereof; if the number of the terminal devices 102 to 104 notified as unavailable in each frequency channel is equal to or more than a predefined threshold, determines the frequency channel to be unavailable; and conducts an information update of the available channels at step S1136. At step S1137, the channel-usage sequence is determined again by the updated available channels, and an update of the channel-usage sequence is conducted at step S1138.

Since the channel-usage sequence can be determined by excluding frequency channels which are unavailable for many the terminal devices 102 to 104, the above described processes enable to reduce a possibility of, even after changing the beacon period for use and changing to a frequency channel, the terminal devices 102 to 104 changing the frequency channel once again because the frequency channel is unavailable due to the influence of the interference and the like.

Furthermore, since changing to a frequency channel, which is unavailable for many of the terminal devices 102 to 104, can be avoided; the terminal devices 102 to 104 can avoid the influence of the interference and the like by rapidly switching the frequency channel in use.

According to embodiment 2 of the present invention, although the information, which notifies about the fact that the frequency channel has been switch, is embedded in the MAC header of the data frame transmitted by the terminal devices 102 to 104, the terminal devices 102 to 104 may notify the control device 101 about the fact that the frequency channel has been switched, in the other frame, other than the data frame. In such a case, the processes from step S1033 to step S1138 shown in FIG. 21 are executed in the process of the other-frame at step S1032.

Embodiment 3

Figure 22:
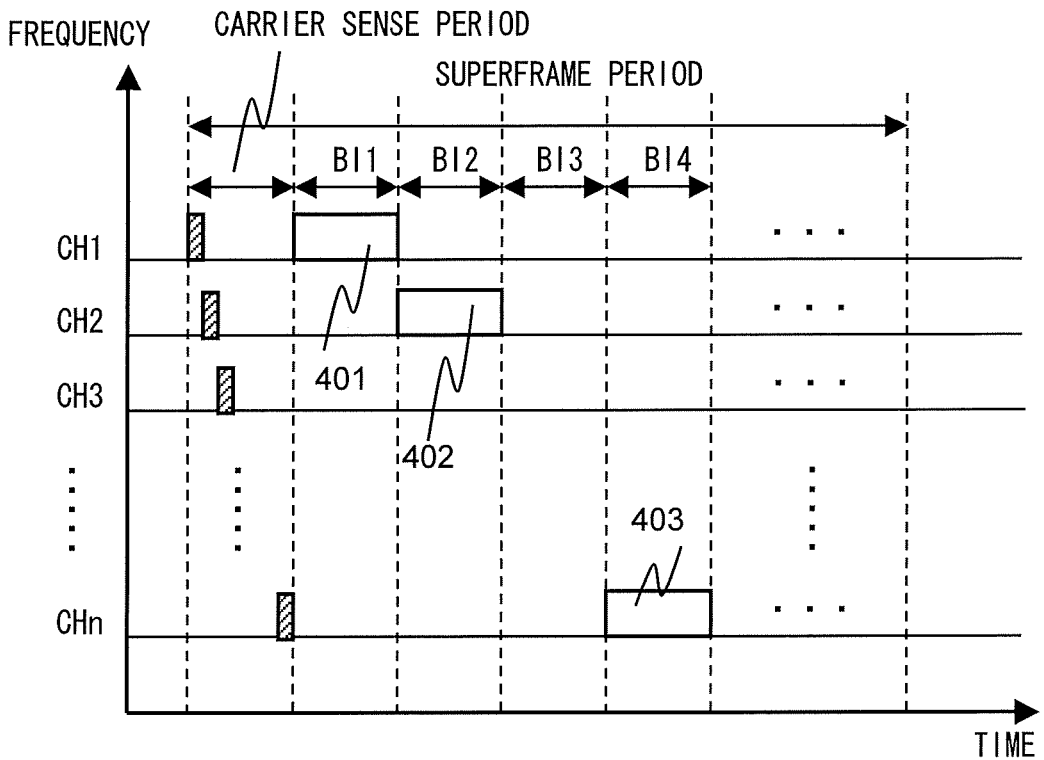
FIG. 22 is a schematic diagram showing a carrier sense period within a superframe according to embodiment 3 of the present invention.

FIG. 22 is a figure showing a configuration of the superframe period according to embodiment 3 of the present invention. Description of the superframe period and the beacon period in FIG. 22 are omitted, since they are identical to the superframe period and the beacon period described in FIG. 5 in embodiment 1 of the present invention.

In FIG. 22, the difference from the superframe period described in FIG. 5 is the fact that a carrier sense period is provided at the beginning of the superframe period. In the carrier sense period, the control device 101, while sequentially switching through all frequency channels, conducts an electric power measurement of each frequency channel for a predefined time period, and determines availabilities of all the frequency channels. The information of the available frequency channels is updated by using this determination result.

As a result of the above described operation, the number of the available channel can be increased if the frequency channel which has been unavailable becomes available again due to a fading of the influence of the interference and the like.

Figure 23:
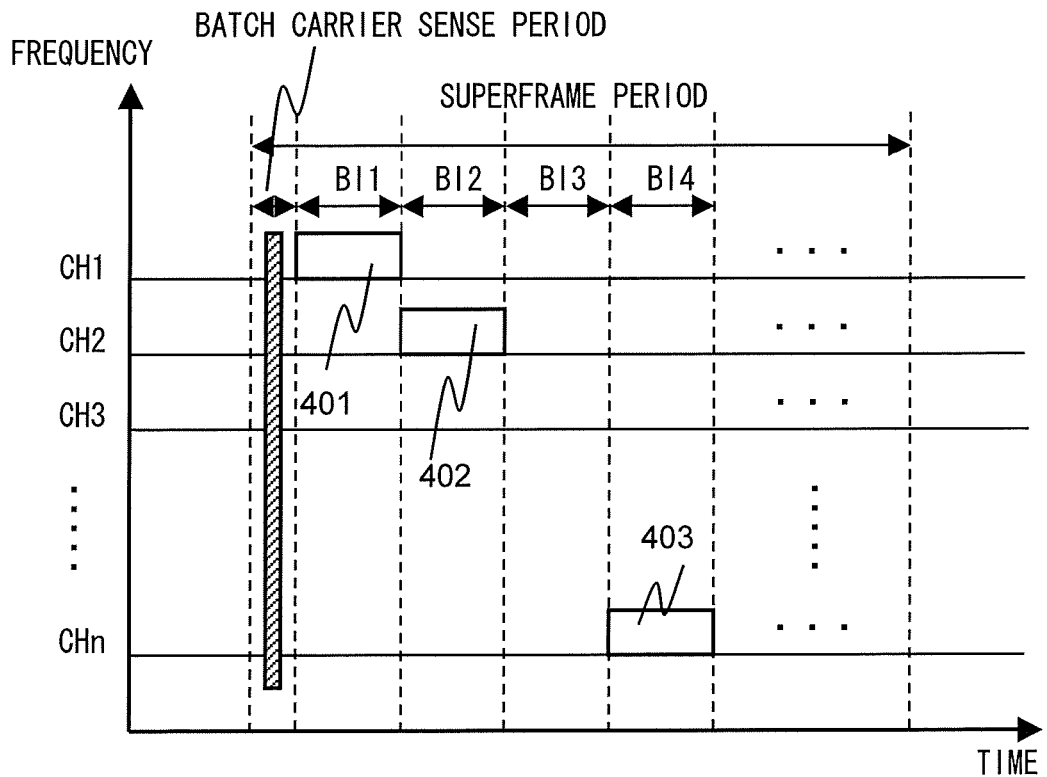
FIG. 23 is a schematic diagram showing another carrier sense period within the superframe according to embodiment 3 of the present invention.
Figure 24:
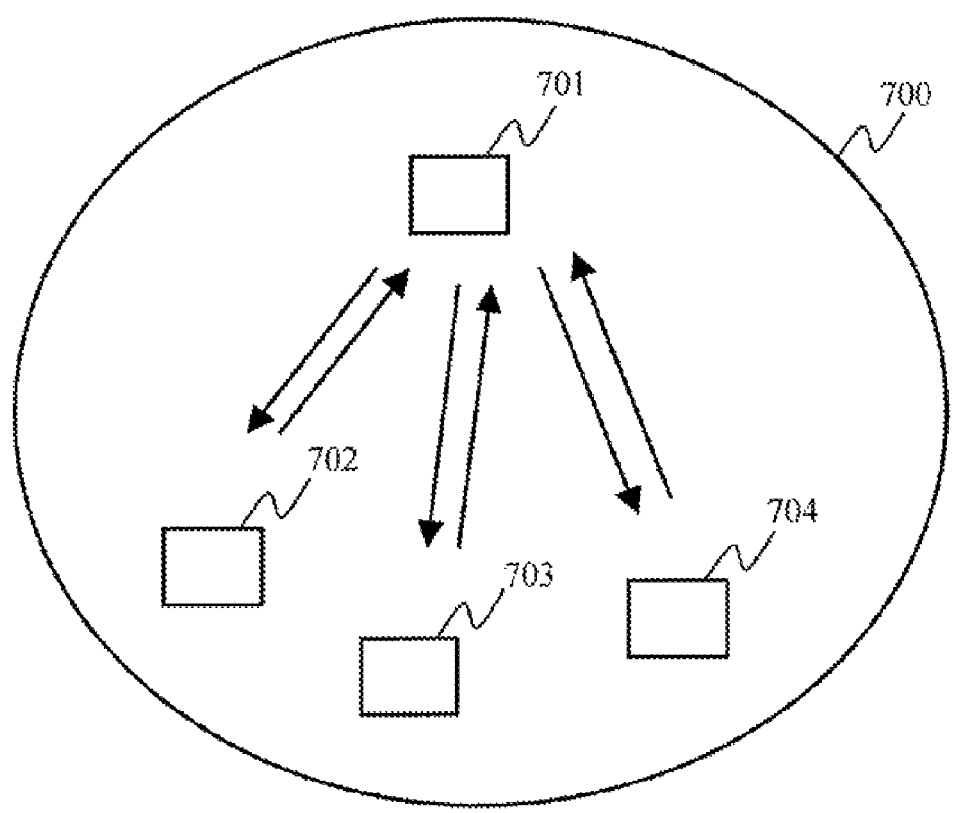
FIG. 24 is a figure showing one example of a conventional wireless network 700.
Figure 25:
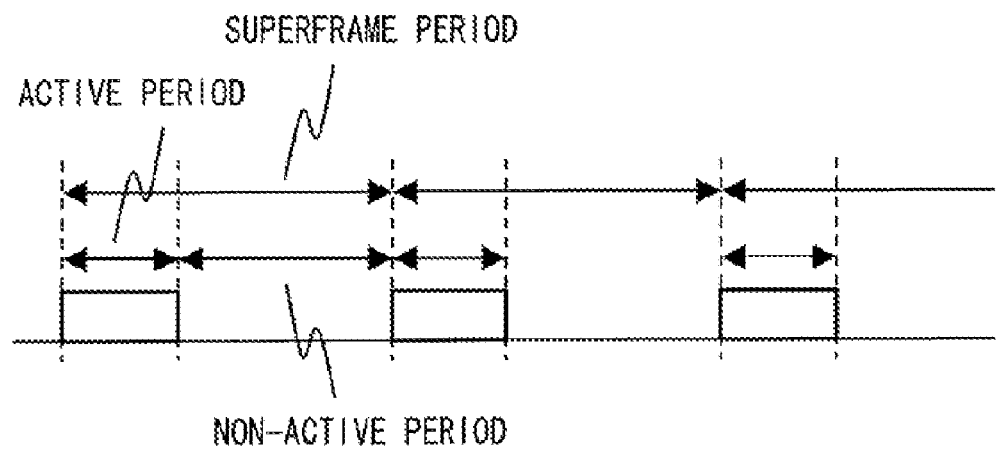
FIG. 25 is a schematic diagram showing a configuration of a conventional superframe.
Figure 26:
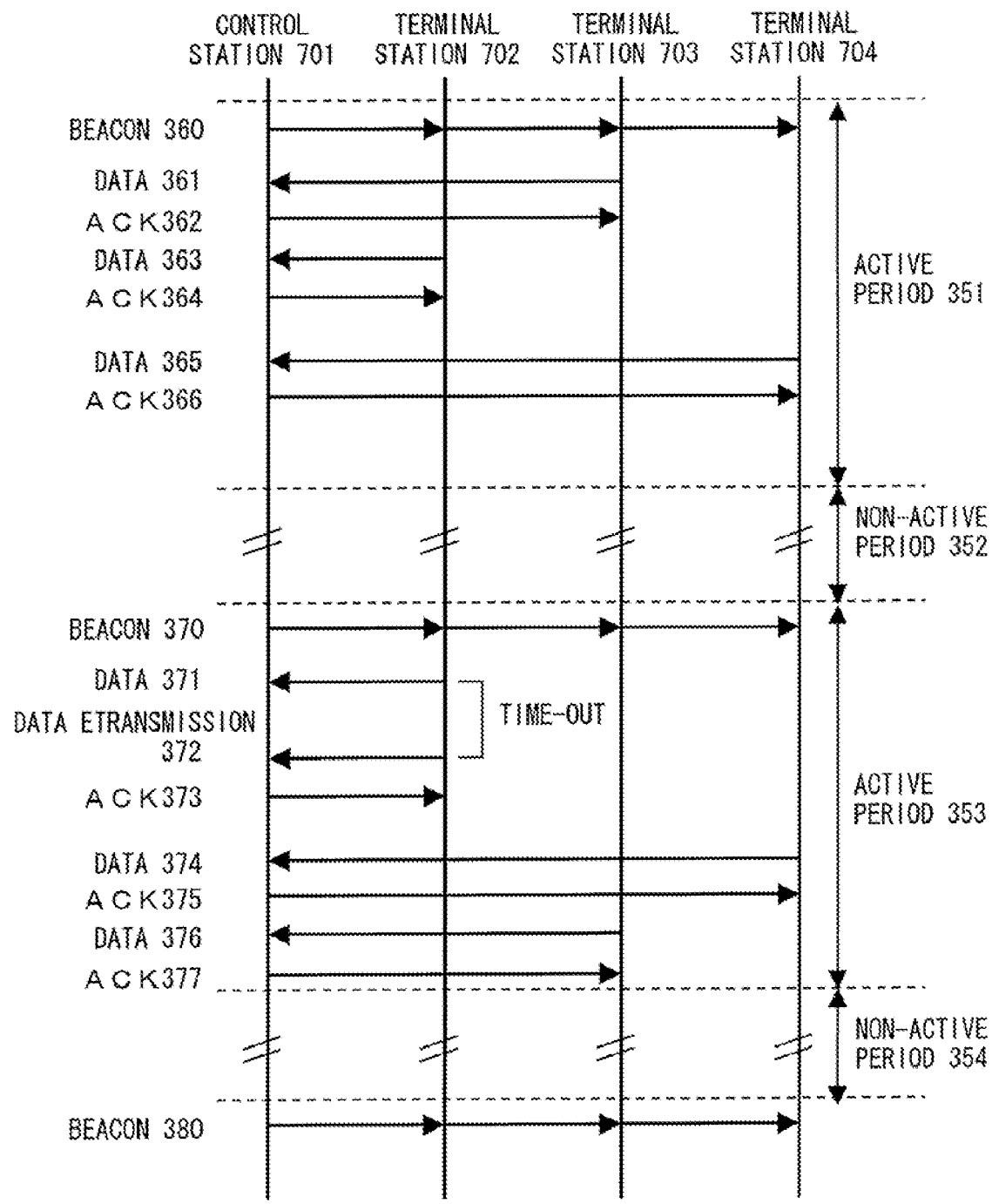
FIG. 26 is a figure showing one example of a conventional communication sequence.

Additionally, FIG. 23 is a figure showing a configuration of another carrier sense period according to embodiment 3 of the present invention. In FIG. 23, in a batch carrier sense period, the control device 101 conducts a frequency analysis of all channels in a batch. With this, the carrier sense period can be shortened.

Furthermore, each of the configurations of the control device 101 according to each of the embodiments described above not including the antenna 201, and each of the configurations of the terminal devices 102 to 104 according to each of the embodiments described above not including the antenna 221, may be attained as an LSI (Large Scale Integration) which is an integrated circuit. These configurations may be realized in a single chip, or may be realized in a single chip so as to include one part of or the entire configuration. The LSI here is also called, depending on the difference in the degree of integration, an IC (Integrated Circuit), a system LSI, a super LSI, or an ultra LSI. Still further, the method of circuit integration is not limited to the LSI, and the circuit integration may be realized by a dedicated circuit or a general-purpose processor.

Furthermore, an FPGA (Field Programmable Gate Array) that is capable of programming after manufacturing the LSI or a reconfigurable processor that is capable of reconfiguring connections and configurations of a circuit cell within the LSI, may be used. Additionally, the calculation of these functional blocks may be calculated, for example, by using a DSP (Digital Signal Processor), a CPU (Central Processing Unit), or the like. In addition, these processing steps may be stored as a program in a storage medium and may be processed by executing the program.

Furthermore, if a technology for the circuit integration that replaces the LSI is introduced with an advance in semiconductor technology or a derivation from other technologies, obviously, such technologies may be used for the integration of the functional block. There may be a possibility of application of biotechnology or the like.

INDUSTRIAL APPLICABILITY

A control device and a terminal device according to the present invention are useful for conducting a communication that has superior latency and power-saving performance, and excellent efficiency, while avoiding, by using a plurality of frequency channels, an interference with other wireless communication systems that use an identical or an adjacent frequency band.

REFERENCE SIGNS LIST

100 wireless network
101 control device
102 to 104 terminal device
201 antenna
202 wireless reception section
203 quality determining section
204 reception data analyzing section
205 memory
206 beacon generating section
207 timing control section
208 channel configuration section
209 wireless transmission section
210 transmission data generating section 211 interface
220 terminal device
221 antenna
222 wireless reception section
223 quality determining section
224 reception data analyzing section
225 memory
226 control section
227 channel configuration section
228 wireless transmission section
229 transmission data generating section
230 interface
500 wireless frame
501 PHY header
502 MAC header
503 payload
504 error correcting code
511 frame control information
512 destination address
513 transmission source address
520 beacon frame payload
521 superframe period
522 beacon period
523 number of beacon periods
524 channel-usage sequence

The invention claimed is:

1. A control device that controls, within a wireless network that includes one or more terminal devices, a wireless communication by using a plurality of frequency channels, the control device comprising:
   a wireless reception section that receives wireless signals of the plurality of frequency channels;
   a quality determining section which determines, based on reception conditions of the wireless signals received by the wireless reception section, available frequency channels among the plurality of frequency channels, and which determines a usage sequence of the determined available frequency channels for a use in a communication;
   a beacon generating section that generates a beacon in which the usage sequence of the frequency channels is described;
   a channel configuration section that configures the frequency channels to be used, in accordance with the usage sequence of the frequency channels;
   a transmission data generating section that generates transmission data;
   a wireless transmission section that transmits, the beacon generated by the beacon generating section, and the transmission data generated by the transmission data generating section, to the one or more terminal devices as wireless signals by using the frequency channels configured by the channel configuration section;
   a timing control section that controls the wireless transmission section regarding a timing of a transmission of the wireless signals; and
   an antenna that transmits and receives the wireless signals via the wireless reception section and the wireless transmission section.

2. The control device according to claim 1, wherein:
   a superframe period, which represents a repeat cycle of the wireless communication, includes an active period in which the wireless communication is conductible, and a non-active period in which the wireless communication is not conducted; and
   the timing control section divides the active period into a plurality of beacon periods as cycle units for transmitting the beacon to the one or more terminal devices, and the beacon is transmitted in each of the plurality of beacon periods.

3. The control device according to claim 2, wherein the channel configuration section switches the frequency channels to be used in each of the plurality of beacon periods in accordance with the usage sequence of the frequency channels.

4. The control device according to claim 3, wherein:
   each of the beacon periods is divided into a period in which the beacon is transmitted, and an access period in which transmission and reception of data to and from the one or more terminal devices are conductible; and
   the wireless transmission section retransmits, when a transmission of a wireless signal fails in the access period of a current beacon period, the wireless signal in the access period of a next beacon period.

5. The control device according to claim 1, wherein the quality determining section determines frequency channels, which are minimally affected by an interference wave, as the available frequency channels among the plurality of frequency channels, based on the reception conditions of the wireless signals received by the wireless reception section.

6. The control device according to claim 1, wherein the quality determining section removes, when notified by the one or more terminal devices via the wireless reception section about a frequency channel that is determined to have an inferior quality, the notified frequency channel from the usage sequence of the frequency channels.

7. The control device according to claim 2, wherein:
   a carrier sense period is provided prior to the active period in the superframe period; and
   the quality determining section performs a carrier sense in the carrier sense period by sequentially switching through all the plurality of frequency channels and by measuring an electrical power of each of the frequency channels.

8. The control device according to claim 2, wherein:
   a batch carrier sense period is provided prior to the active period in the superframe period; and
   the quality determining section performs a carrier sense in the batch carrier sense period by conducting a frequency analysis of the plurality of frequency channels in a batch.

9. A terminal device that conducts, within a wireless network that includes a control device which controls a wireless communication by using a plurality of frequency channels, a wireless communication with the control device by using either one of the plurality of frequency channels in accordance with a control of the control device, the terminal device comprising:
   a wireless reception section that receives, from the control device as a wireless signal, a beacon in which a usage sequence of available frequency channels among the plurality of frequency channels is described;
   a channel configuration section that configures a frequency channel to be used, in accordance with the usage sequence which is of the frequency channels and which is described in the beacon;
   a quality determining section that determines, based on a reception condition of the wireless signal received by the wireless reception section, a quality of the frequency channel that is used for a communication with the control device;
   a control section that instructs, when the quality determining section determines that the quality of the frequency channel is inferior, the channel configuration section to switch the frequency channel to be used based on the usage sequence which is of the frequency channels and which is described in the beacon received from the control device;

a transmission data generating section that generates transmission data;

a wireless transmission section that transmits the transmission data generated by the transmission data generating section to the control device as a wireless signal, by using the frequency channel configured by the channel configuration section; and an antenna that transmits and receives the wireless signal via the wireless reception section and the wireless transmission section.

10. The terminal device according to claim 9, wherein the control section notifies, via the wireless transmission section, the control device about a frequency channel that is determined to have an inferior quality by the quality determining section.

11. The terminal device according to claim 9, wherein the quality determining section determines a frequency channel that is largely affected by an interference wave as the frequency channel that has an inferior quality, based on the reception condition of the wireless signal received by the wireless reception section.

12. The terminal device according to claim 9, wherein the channel configuration section switches the frequency channel to be used in each beacon period, in accordance with the usage sequence which is of the frequency and which is included in the beacon.

13. A communication system that includes, a control device that controls a wireless communication by using a plurality of frequency channels within a wireless network which includes one or more terminal devices, and a terminal device that conducts, in accordance with a control of the control device, a wireless communication with the control device by using either one of the plurality of frequency channels, wherein the control device comprises:
a first wireless reception section that receives wireless signals of the plurality of frequency channels;
a first quality determining section which determines, based on reception conditions of the wireless signals received by the first wireless reception section, available frequency channels among the plurality of frequency channels, and which determines a usage sequence of the determined available frequency channels for a use in a communication;
a beacon generating section that generates a beacon in which the usage sequence of the frequency channels is described;
a channel configuration section that configures the frequency channels to be used, in accordance with the usage sequence of the frequency channels;
a first transmission data generating section that generates transmission data;
a first wireless transmission section that transmits, the beacon generated by the beacon generating section, and the transmission data generated by the first transmission data generating section, to the one or more terminal devices as wireless signals by using the frequency channels configured by the channel configuration section;
a timing control section that controls the wireless transmission section regarding a timing of a transmission of the wireless signals; and
a first antenna that transmits and receives the wireless signals via the first wireless reception section and the first wireless transmission section, and wherein the terminal device comprises:
a second wireless reception section that receives, from the control device as a wireless signal, a beacon in which the usage sequence of the available frequency channels among the plurality of frequency channels is described;
a second channel configuration section that configures a frequency channel to be used, in accordance with the usage sequence which is of the frequency channels and which is described in the beacon;
a second quality determining section that determines, based on a reception condition of the wireless signal received by the second wireless reception section, a quality of the frequency channel that is used for a communication with the control device;
a control section that instructs, when the second quality determining section determines that the quality of the frequency channel is inferior, the second channel configuration section to switch the frequency channel to be used based on the usage sequence which is of the frequency channels and which is described in the beacon received from the control device;
a second transmission data generating section that generates transmission data;
a second wireless transmission section that transmits the transmission data generated by the second transmission data generating section to the control device as a wireless signal, by using the frequency channel configured by the second channel configuration section; and
a second antenna that transmits and receives the wireless signal via the second wireless reception section and the second wireless transmission section.

14. An integrated circuit included in a control device that controls a wireless communication by using a plurality of frequency channels within a wireless network that includes one or more terminal devices, wherein the control device comprises an antenna that transmits and receives a wireless signal, and the integrated circuit integrates circuits which act as:
a wireless reception section that receives wireless signals of the plurality of frequency channels;
a quality determining section which determines, based on reception conditions of the wireless signals received by the wireless reception section, available frequency channels among the plurality of frequency channels, and which determines a usage sequence of the determined available frequency channels for a use in a communication;
a beacon generating section that generates a beacon in which the usage sequence of the frequency channels is described;
a channel configuration section that configures the frequency channels to be used, in accordance with the usage sequence of the frequency channels;
a transmission data generating section that generates transmission data;
a wireless transmission section that transmits, the beacon generated by the beacon generating section, and the transmission data generated by the transmission data generating section, to the one or more terminal devices as wireless signals by using the frequency channels configured by the channel configuration section; and a timing control section that controls the wireless transmission section regarding a timing of a transmission of the wireless signals.

15. An integrated circuit included in a terminal device that conducts, within a wireless network that includes a control device which controls a wireless communication by using a plurality of frequency channels, a wireless communication with the control device by using either one of the plurality of frequency channels in accordance with a control of the control device, wherein the terminal device comprises an antenna that transmits and receives the wireless signal, and the integrated circuit integrates circuits which act as:

a wireless reception section that receives, from the control device as a wireless signal, a beacon in which a usage sequence of available frequency channels among the plurality of frequency channels is described;

a channel configuration section that configures a frequency channel to be used, in accordance with the usage sequence which is of the frequency channels and which is described in the beacon;

a quality determining section that determines, based on a reception condition of the wireless signal received by the wireless reception section, a quality of the frequency channel that is used for a communication with the control device;

a control section that instructs, when the quality determining section determines that the quality of the frequency channel is inferior, the channel configuration section to switch the frequency channel to be used based on the usage sequence which is of the frequency channels and which is described in the beacon received from the control device;

a transmission data generating section that generates transmission data; and a wireless transmission section that transmits the transmission data generated by the transmission data generating section to the control device as a wireless signal, by using the frequency channel configured by the channel configuration section.

16. A method executed by a control device that controls a wireless communication by using a plurality of frequency channels within a wireless network that includes one or more terminal devices, the method comprising steps of:

receiving wireless signals of the plurality of frequency channels;

determining available frequency channels among the plurality of frequency channels based on reception conditions of the wireless signals, and determining a usage sequence of the determined available frequency channels for a use in a communication;

generating a beacon in which the usage sequence of the frequency channels is described;

configuring the frequency channels to be used, in accordance with the usage sequence of the frequency channel;

generating transmission data;

transmitting, by using the configured frequency channels, the generated beacon and the transmission data to the one or more terminal devices as wireless signals; and controlling a timing of a transmission of the wireless signals.

17. A method executed by a terminal device that conducts, within a wireless network that includes a control device which controls a wireless communication by using a plurality of frequency channels, a wireless communication with the control device by using either one of the plurality of frequency channels in accordance with a control of the control device, the method comprising steps of:

receiving, from the control device as a wireless signal, a beacon in which a usage sequence of available frequency channels among the plurality of frequency channels is described;

configuring a frequency channel to be used, in accordance with the usage sequence which is of the frequency channels and which is described in the beacon;

determining, based on a reception condition of the received wireless signal, a quality of the frequency channel that is used for a communication with the control device;

controlling, when the quality of the frequency channel is determined to be inferior, a switching of the frequency channel to be used based on the usage sequence which is of the plurality of frequency channels and which is described in the beacon received from the control device;

generating transmission data; and transmitting the transmission data to the control device as a wireless signal, by using the configured frequency channel.

18. A non-transitory computer-readable medium having a program stored thereon to be executed by a control device that controls a wireless communication by using a plurality of frequency channels within a wireless network that includes one or more terminal devices, the program causing the control device to execute the steps of:

receiving wireless signals of the plurality of frequency channels;

determining available frequency channels among the plurality of frequency channels based on reception conditions of the wireless signals, and determining a usage sequence of the determined available frequency channel for a use in a communication;

generating a beacon in which the usage sequence of the frequency channel is described;

configuring the frequency channels to be used, in accordance with the usage sequence of the frequency channel;

generating transmission data;

transmitting, by use the configured frequency channels, the generated beacon and the transmission data to the one or more terminal devices as wireless signals; and controlling a timing of a transmission of the wireless signal.

19. A non-transitory computer-readable medium having a program stored thereon to be executed by a terminal device that conducts, within a wireless network that includes a control device which controls a wireless communication by using a plurality of frequency channels, a wireless communication with the control device by using either one of the plurality of frequency channels in accordance with a control of the control device, the program causing the terminal device to execute the steps of:

receiving, from the control device as a wireless signal, a beacon in which a usage sequence of available frequency channels among the plurality of frequency channels is described;

configuring a frequency channel to be used, in accordance with the usage sequence which is of the frequency channels and which is described in the beacon;

determining, based on a reception condition of the received wireless signal, a quality of the frequency channel used for communication with the control device;

controlling, when the quality of the frequency channel is determined to be inferior, a switching of the frequency channel to be used based on the usage sequence which is of the frequency channels and which is described in the beacon received from the control device;

generating transmission data; and transmitting the transmission data to the control device as a wireless signal, by using the configured frequency channel.

* * * * *